(12) United States Patent
Gillespie

(10) Patent No.: US 10,528,868 B2
(45) Date of Patent: Jan. 7, 2020

(54) SOLVING NP-COMPLETE PROBLEMS WITHOUT HYPER POLYNOMIAL COST

(71) Applicant: Clayton Gillespie, Vienna, VA (US)

(72) Inventor: Clayton Gillespie, Vienna, VA (US)

( * ) Notice: Subject to any disclaimer, the term of this patent is extended or adjusted under 35 U.S.C. 154(b) by 499 days.

(21) Appl. No.: 15/126,227

(22) PCT Filed: Mar. 25, 2015

(86) PCT No.: PCT/US2015/022377
§ 371 (c)(1),
(2) Date: Sep. 14, 2016

(87) PCT Pub. No.: WO2015/148599
PCT Pub. Date: Oct. 1, 2015

(65) Prior Publication Data
US 2017/0083812 A1 Mar. 23, 2017

Related U.S. Application Data

(60) Provisional application No. 61/970,291, filed on Mar. 25, 2014.

(51) Int. Cl.
*G06N 3/04* (2006.01)
*G06F 17/17* (2006.01)
(Continued)

(52) U.S. Cl.
CPC .............. *G06N 5/003* (2013.01); *G06F 17/11* (2013.01); *Y04S 10/54* (2013.01)

(58) Field of Classification Search
CPC .......... G06F 17/11; Y04S 10/54; G06N 5/003
(Continued)

(56) References Cited

U.S. PATENT DOCUMENTS

| 5,228,115 A | 7/1993 | Natarajan |
|---|---|---|
| 5,576,965 A | 11/1996 | Akasaka |
| (Continued) | | |

FOREIGN PATENT DOCUMENTS

| CN | 101848229 A | 9/2010 |
|---|---|---|
| CN | 102063643 A | 5/2011 |
| (Continued) | | |

OTHER PUBLICATIONS

Kelnhofer, Richard W. "Applications of Interval Methods to Parameter Set Estimation from Bounded-Error Data" PhD thesis, Marquette University Dept. of Electrical and Computer Engineering 1997.
(Continued)

*Primary Examiner* — Kuen S Lu
(74) *Attorney, Agent, or Firm* — Blueshift IP, LLC; Robert Plotkin

(57) ABSTRACT

Within satisfaction problems or any decision or other problem which is reducible to a satisfaction problem, the invention tracks the paths along which implications propagate and identifies conditional contradictions and subsequently moves the contradictions back down the implicational paths toward assumptions or other unreasoned assertions in order to expel the contradictions. The action is completed in less time than is incurred by existing methods and thus provides a performance improvement to the devices, software, or processes which address such problems. Such problems are addressed by devices, software, and processes related to many technical fields, including: ore refining; pipeline routing; yarn manufacture; fabric cutting; sawyering; mechanical component design; structural design of data processing systems; design and analysis of circuits or semiconductor masks; inspection and guarding of containers, pipes, and galleries; sensor array operations; orbital satellite opera-
(Continued)

tions; data compression; chemical analysis; design and analysis of proteins.

13 Claims, 2 Drawing Sheets

(51) Int. Cl.
*G06N 5/00* (2006.01)
*G06F 17/11* (2006.01)

(58) Field of Classification Search
USPC .......................................................... 706/17
See application file for complete search history.

(56) References Cited

U.S. PATENT DOCUMENTS

| | | | |
|---|---|---|---|
| 5,636,328 A | 6/1997 | Kautz | |
| 6,038,392 A * | 3/2000 | Ashar | G06F 17/5054 703/27 |
| 7,187,672 B1 | 3/2007 | Vishnu | |
| 7,356,519 B1 | 4/2008 | Goldberg | |
| 8,291,319 B2 | 10/2012 | Li | |
| 8,577,825 B2 * | 11/2013 | Gillespie | G06F 17/11 706/46 |
| 2002/0143754 A1 | 10/2002 | Paulley | |
| 2002/0157009 A1 | 10/2002 | Yamamoto | |
| 2004/0103108 A1 | 5/2004 | Andreev | |
| 2006/0121493 A1 | 6/2006 | Sasagawa | |
| 2006/0173661 A1 | 8/2006 | Kohn | |
| 2007/0005523 A1 | 1/2007 | Maren | |
| 2009/0192968 A1 | 7/2009 | Tunstall-Pedoe | |
| 2010/0269078 A1 | 10/2010 | Dsouza | |
| 2011/0161266 A1 | 6/2011 | Gillespie | |
| 2011/0307435 A1 * | 12/2011 | Overell | G06F 17/278 706/46 |
| 2012/0220276 A1 * | 8/2012 | Kobylarz | H04W 4/00 455/414.1 |
| 2013/0283236 A1 | 10/2013 | Kuznetsov | |
| 2015/0089409 A1 * | 3/2015 | Asseily | G06Q 10/10 715/765 |
| 2019/0007711 A1 * | 1/2019 | Geva | H04N 21/23424 |

FOREIGN PATENT DOCUMENTS

| | | |
|---|---|---|
| EP | 3123302 A1 | 2/2017 |
| JP | H11353357 | 12/1999 |
| JP | 2012003733 | 1/2012 |
| WO | 2009097290 | 8/2009 |
| WO | 2009097290 A2 | 8/2009 |
| WO | 2015148599 A1 | 10/2015 |

OTHER PUBLICATIONS

Koch, Hans et al. "Computer-Assisted Proofs in Analysis and Programming in Logic: A Case Study" SIAM Review 1996.
Kohout, Ladislav J. and Stabile, Isabel "Interval Valued Inference in Medical Knowledge-Based System CLINAID" Interval Computations 1993.
Kolisch, R. and Drexl, A. "Local Search for Nonpreemptive Multi-Mode Resource-Constrained Project Scheduling" IIE transactions 1997.
Kolaitis, P.G. et al. "Conjunctive-query containment and constraint satisfaction." Proceedings of the seventeenth ACM SIGACT-SIGMOD-SIGART symposium on Principles of database systems, pp. 205-213. ACM, 1998.
Lamiri, Mehdi et al. "A Stochastic model for operating room planning with elective and emergency demand for surgery" European Journal of Operational Research 2006.
Mangasariant, O.L. et al. "Pattern Recognition via Linear Programming: Theory and Application to Medical Diagnosis" Large-scale Numerical Optimization 1990.
Marinelli, Fabrizio et al. "A Lagrangian Heuristic for Satellite Range Scheduling with Resource Constraints" Computers and Operations Research 2011.
Martello, Silvano et al. "The Three-Dimensional Bin Packing Problem" Operations Research 2000.
Miers, Ian et al. "Zerocoin: Anonymous Distributed E-Cash from Bitcoin" IEEE Symposium on Security and Privacy 2013.
Milidiú, Ruy Luiz et al. "Pipesworld: Planning Pipeline Transportation of Petroleum Derivatives" Proceedings ICAPS-03 Workshop on the Competition 2003.
Mizumoto, Teruhiro et al. "Transportation Scheduling Method for Patients in MCI using Electronic Triage Tag" Proceedings of International Conference on eHealth, Telemedicine, and Social Medicine 2011.
Munawar, A. et al. "Hybrid of genetic algorithm and local search to solve max-sat problem using nvidia cuda framework." Genetic Programming and Evolvable Machines, vol. 10, No. 4, Published on line Oct. 20, 2009. pp. 391-415.DOI 10.1007/s10710-009-9091-4.
Navaie, Keivan and Yanikomeroglu, Halim "Downlink Joint Basestation Assignment and Packet Scheduling Algorithm for Cellular CDMA/TDMA Networks" Communications 2006.
Pacifici, Giovanni et al. "Managing the Response Time for Multi-tiered Web Applications" IBM T.J. Watson Research Center, Yorktown, NY. Tech. Rep. RC23651 2005.
Perucci, Daniel and Sabia, Juan "Real Roots of Univariate Polynomials and Straight Line Programs" Journal of Discrete Algorithms 2007.
Scott, W. et al. "View Planning for Automated 3D Object Reconstruction and Inspection" ACM Computing Surveys 2003.
Russell, S.J. et al. "Artificial Intelligence: A Modern Approach: Second Edition—Chapter 5: Constraint Satisfaction Problems." 2003.
Schiex, T. et al. "Valued constraint satisfaction problems: Hard and easy problems." International Joint Conference on Artificial Intelligence, vol. 14, pp. 631-639. Lawrence Erlbaum Associates Ltd, Aug. 1995.
Sheikh, Riyaz A. and Lanjewar, Ujwal A. "Decision Support System for Cotton Bales Blending Using Genetic Algorithm" International Journal of Computer Applications 2010.
Tóth, Boglárka "Interval Methods for Competitive Location Problems" Diss. PhD Thesis Dept. Computer Architecture and Electronics, University of Almeriá, Spain 2007.
Van Hentenryck, P. et al. "Constraint satisfaction using constraint logic programming." Artificial intelligence, vol. 58, No. 1, 1992. pp. 113-159.
Warner, Lars and Vogel, Ute "Optimization of Energy Supply Networks using Ant Colony Optimization" EnviroInfo 2008 2008.
Weicker, Nicole et al. "Evolutionary Multiobjective Optimization for Base Station Transmitter Placement with Frequency Assignement" IEEE Transactions on Evolutionary Computation 2003.
Young, Christina M. et al. "Multiobjective Optimization of a Port-of-Entry Inspection Policy" IEEE Transactions on Automation Science and Engineering 2010.
Isler, Volkan et al. "Target Tracking with Distributed Sensors: The Focus of Attention Problem" Computer Vision and Image Understanding 2005.
Davidson, M. "Proximal point mappings and constraint aggregation principle." Working Paker No. WP-96-102. International Institute for Applied Systems Analysis. Aug. 1996. 20 pages.
Johnson et al. A Polynomial Algorithm for the Source Location Problem in Digraphs. CDAM Research Report LSE-CDAM-2004-02. Feb. 2004 Retrieved from the Internet <URL: http://fwww.cdam.lse.ac.uk/Reports/Filesfcdam-2004-02.pdf>.
Abiteboul et al. Deduction in the Presence of Distribution and Contradictions. WebDB. May 2012, Scottsdale, United States. 2012. Retrieved from the Internet <URL: https://hal.inria.fr/hal-00809300/file/p5.pdf>.
Griffin et al. An Algorithm for Constructing and Searching Spaces of Alternative Hypotheses. IEEE Transactions on Systems, Man, and Cybernetics—Part B: Cybernetics, vol. 41, No. 3, Jun. 2011 Retrieved from the Internet <URL:http://fieeexplore.ieee.org/xplflogin.

(56) References Cited

OTHER PUBLICATIONS jsp?tp=&arnumber=5659971&url=http%3A%2F%2Fieeexplore.ieee.org%2Fiel5%2F3477%2F5767816%2F05659971.pdf'k3Farnumber%3D5659971>.
Javanshir, H. and Shadalooee, M. "The Trim Loss Concentration in One-Dimensional Cutting Stock Problem (1D-CSP) by Defining a Virtual Cost" Journal of Industrial Engineering International 2007.
Kenyon, Claire and Rémila, Eric "A Near-Optimal Solution to a Two-Dimensional Cutting Stock problem" Mathematics of Operational Research 2000.
Peng, Jufeng and Akella, Srinivas "Coordinating Multiple Robots with Kinodynamic Constraints along Specified Paths" International Journal of Robotics Research 2005.
Ruhl, Matthias and Hartenstein, Hannes "Optimal Fractal Coding is NP-Hard" Proceedings of the International Conference on Image Processing 1997.
Pierce, Niles A. and Winfree, Erik "Protein Design is NP-Hard" Protein Engineering 2002.
Gibbens, R.J. et al. "Dynamic Alternative Routing—Modelling and Behaviour" Proceedings of the 12th International Teletraffic Congress 1988.
Capone, Antonio et al. "Multi-layer Network Design with Multicast Traffic and Statistical Multiplexing" Global Telecommunications Conference 2007.
Spälti, Susan B. and Liebling, Thomas M. "Modeling the satellite placement problem as a network flow problem with one side constraint" Operations Research Spektrum 1991.
Pownuk, Andrzej "Optimization of mechanical structures using interval analysis" Computer Assisted Mechanics and Engineering Sciences 2000.
Valée, Brigitte "Generation of Elements with Small Modular Squares and Provably Fast Integer Factoring Algorithms" Mathematics of Computation 1991.
Baruah, Sanjoy K. "Preemptively Scheduling Hard-Real-Time Sporadic Tasks on One Processor" Real-Time Systems Symposium 1990.
Chakrabarty, Krishnendu "Optimal Test Access Architectures for System-on-a-Chip" ACM Transactions on Design Automation of Electronic Systems 2001.
Kahng, Andrew B. et al. VLSI Physical Design: from Graph Partitioning to Timing Closure 2011.
Blondel, Vincent D. and Megretski, Alexandre eds. Unsolved Problems in Mathematical Systems and Control Theory 2009.
Parsons, David and Canny, John "Geometric Problems in Molecular Biology and Robotics" ISMB 1994.
Kremer, Ulrich "Optimal and Near-Optimal Solutions for Hard Compilation Problems" Parallel Processing Letters 1997.
Megiddo, Nimrod and Sarkar, Vivek "Optimal Weighted Loop Fusion for Parallel Programs" Proceedings of the ninth annual ACM symposium on Parallel algorithms and architectures 1997.
Apostolico, Alberto and Giancarlo, Raffaele "Sequence Alignment in Molecular Biology" DIMACS Series in Discrete Math and Theoretical Computer Sciences 1999.
Arkin, Esther "Beautification is Hard" Cornell University Operations Research and Industrial Engineering 1988.
Bach, Nguyen "Dependency Structures for Statistical Machine Translation" Diss. Carnegie Melon University 2012.
Bar-Noy, Amotz et al. "Assigning Sensors to Missions with Demands" Algorithmic Aspects of Wireless Sensor Networks 2008.
Bi Jingguo et al. "Sub-Linear Root Detection, and New Hardness Results, for Sparse Polynomials Over Finite Fields" arXiv preprint arXiv: 1204.1113 2012.
Bertsekas, D.P. et al. "Partial Proximal Minimization Algorithms for Convex Programming." SIAM Journal on Optimization, vol. 4, No. 3. Aug. 1994. pp. 551-572.

Bovet, Daniel Pierre; Crescenzi, Pierluigi—Introduction to the Theory of Complexity (Prentice Hall International (UK) Ltd.; 1994) Hertfordshire, UK.
Boykov, Yuri et al. "Fast Approximate Energy Minimization via Graph Cuts" IEEE Transactions on Pattern Analysis and Machine Intelligence 2001.
Cai Mao-cheng and Deng Xiaotie "Complexity of Exchange Markets" Handbook on Information Technology in Finance 2008.
Campbell, Ann et al. "The Inventory Routing Problem" Fleet Management and Logistics 1998.
Efrat, Alon and Har-Peled, Sariel "Guarding Galleries and Terrains" Information Processing Letters 2006.
El-Alfy, Hazem Mohamed "Computer Algebra and its Applications" 2001.
Erlebach, Thomas et al. "An Algorithmic View on OVSF Code Assignment" Algorithmica 2007.
Everett, J.E. "A Mine Planning Model Using a Modified Greedy Algorithm" 19th Annual Conference of the Production and Operations Management Society 2000.
Fischer, Klaus et al. "Cooperative Transportation Scheduling: an Application Domain for DAI" DFKI GmbH 1995.
Zweig, G. et al. "Arc Minimization in Finite State Decoding Graphs with Cross-Word Acoustic Context" INTERSPEECH 2002.
Folino, G. et al. "Solving the satisfiability problem by a parallel cellular genetic algorithm." Proceedings of the 24th Euromicro Conference 1998, vol. 2, pp. 715-722. IEEE, 1998.
Ganesan, Deepak et al. "Power-Efficient Sensor Placement and Transmission Structure for Data Gathering under Distortion Constraints" Papers, Center for Embedded Network Sensing 2004.
Gökçen, Hadi and Erel, Erdal "Binary Integer Formulation for Mixed-Model Assembly Line Balancing Problem" Computers and Industrial Engineering 1998.
Gorinevsky, Dimitry "Structured Uncertainty Analysis of Robust Stability for Multidimensional Array Systems" IEEE Transactions on Automatic Control 2003.
Guesgen, H.W.; Hertzberg, J.—A Perspective of Constraint-Based Reasoning (Springer; 1992) Berlin, Germany.
Gwaltney, C. Ryan et al. "Interval Methods for Nonlinear Equation Solving" Handbook of Granular Computing, Chichester UK 2008.
Hane, Christopher A. and Ratliff, H. Donald "Sequencing Inputs to Multi-Commodity Pipelines" Annals of Operations Research 1995.
Harrison, S.A. and Price, M.E. "Task Scheduling for Satellite Based Imagery" Proceedings of the Eighteenth Workshop of the UK Planning and Scheduling Special Interest Group 1999.
Hart, William E. and Istrail, Sorin "Robust Proofs of NP-Hardness for Protein Folding: General Lattices and Energy Potentials" Journal of Computational Biology 1997.
Ioannidis, Yannis E. "Query Optimization" ACM Computing Surveys (CSUR) 1996.
Janhunen, Tomi et al. "On Testing Answer-Set Programs" ECAI 2010 2010.
Johnson, Tomas "On some computer-aided proofs in analysis" Dept. of Mathematics, Upsalla University 2007.
Jones, Gareth et al. "Development and Validation of a Genetic Algorithm for Flexible Docking" Journal of Molecular Biology 1997.
Hidetomo Nabeshima et al. "Principles of Modern SAT Solvers," Feature Article: Recent Development of SAT Technology, Journal of Artificial Intelligence Society, Japan, Artificial Intelligence Society, Jan. 1, 2010, vol. 25, firsl vol. (Issue 139) pp. 68-76, ISSN 0912-8085.
Notification of Refusal dated Feb. 19, 2019 in Japanese Patent Application No. 2016-526262.

\* cited by examiner

SOLVING NP-COMPLETE PROBLEMS WITHOUT HYPER POLYNOMIAL COST

CROSS-REFERENCE TO RELATED APPLICATIONS

This application is related to U.S. patent application Ser. No. 12/823,652, filed on Jun. 25, 2010, entitled, "System, method and device for solving problems in NP without hyper-polynomial cost," now U.S. Pat. No. 8,577,825 B2, which is hereby incorporated by reference herein.

BACKGROUND

Computational complexity theory is a branch of computer science that focuses on classifying computational problems according to their inherent difficulty. One such classification is "NP", which is the class of problems that can be solved in polynomial time by an algorithm running on a non-deterministic Turing machine. An algorithm is said to run in polynomial time if its running time is upper-bounded by a polynomial function of the size of the input for the algorithm, i.e., $T(n) \in O(n^k)$ for some constant k. The present invention might be compared to the Newton Method, the Davis-Putnam-Logemann-Loveland (DPLL) algorithm, and the Conflict-Driven Clause Learning (CDCL) algorithm.

SUMMARY

Embodiments of the present invention address problems associated with automated solution of NP, NP-complete, and NP-hard problems in polynomial time without the need for tuning. Embodiments of the present invention may be implemented using any of a variety of techniques, such as computer-implemented methods and/or systems. Any reference herein to embodiments of the present invention which are implemented using a "method" or "methods" should be understood to include embodiments implemented using methods and/or systems. Similarly, any reference herein to embodiments of the present invention which are implemented using a "system" or "systems" should be understood to include embodiments implemented using methods and/or systems.

Embodiments of the present invention provide a method for solving NP, NP-complete, or NP-hard problems in polynomial time without the need for tuning. Certain embodiments of the present invention include a method which includes converting a given problem definition into an expression composed of one or more constraints; selecting assumed value predicates for the variables of the expression; propagating the implications of the assumptions; identifying any contradictions caused by the implications of the assumptions; determining, for each identified contradiction, whether that contradiction can be moved towards a corresponding location where it will resolve as an implication; for each contradiction which can be so moved, moving that contradiction towards its corresponding location; and, for any contradiction which cannot be so moved, reporting that the expression is unsatisfiable.

Embodiments of the present invention provide a method for improving the time requirement of solving of a logical or numerical problem by resolving conditional contradictions arising during the solving of the problem, without the need for tuning. The problem is formed of constraints, each of which includes one or more variables. Solving the problem includes determining whether the problem is satisfiable by a set of variable values or unsatisfiable when there are no sets of variable values that satisfy the expression. The problem may be a logical expression in conjunct normal form (CNF) such that it is a conjunction of a set of constraints, where each of the constraints is a disjunction of several variables. The method includes receiving, as part of the problem being input to a computer, unconditional assertions regarding values of zero or more of the variables; making assumptions regarding values of one or more of the variables that are not subject of the unconditional assertions; and using the assumptions or the unconditional assertions to make assertions of terms regarding values for other variables of the problem. A constraint is forced to assert a term when, as a result of existing assumptions or assertions, the values of all but one of the terms are restricted. Then, for the constraint to be satisfied, the one remaining term becomes asserted and cannot be negated without creating a contradiction. If the value of the asserted term is not already determined, it becomes determined. At this point, the constraint is asserting, and if it caused the value of the asserted term to become determined, then the assertion and the constraint that asserts it becomes prevailing. The method continues with setting values for the variables as determined values responsive to the unconditional assertions, the assumptions, or the generated conditional assertions. The variables not having a determined value are called free variables. The iteration of the making of assumptions, the making of assertions, and the setting of values for the variables as determined, forms the process of implication. A contradiction may be conditioned on the assumptions and arises when all terms of some constraint are restricted. The method moves a contradiction by forcing the assertion of a value of a term of a first contradicted constraint which in turn restricts terms of the same variable in other constraints that are not already restricted or negates disagreeing asserted values or assumptions of the same variable, possibly producing a contradiction in a contiguous second constraint and always resolving the contradiction in the first constraint. The method directs this motion of the contradiction in order to expel the contradiction from the problem. It is advantageous for the method not to force the assertion of a value of any term that is unconditionally negated. It is also advantageous for the direction of motion of a contradiction to be chosen in such a way that all possible paths of escape will be explored if the contradiction cannot be expelled. The method detects when the term being counter-asserted has no assumptions in the path behind the direction of motion and marks that assertion as being unconditional. The method continues by reporting that the problem is satisfied if the count of the free variables is zero and all contradictions have been expelled, or by reporting that the problem is unsatisfiable if a contradiction is encountered where all the terms are unconditionally negated.

The technical consequence of such embodiments is comparable to the invention of random access memory (RAM) because RAM provides an improvement in data access times that is logarithmic compared to previous linear time requirements, and such a ratio is similar to the ratio between polynomial time and hyper-polynomial time. Without RAM many current products would be impossible, and similarly many new products will become possible with the introduction of embodiments of the present invention.

BRIEF DESCRIPTION OF THE DRAWINGS

Referring to FIG. 1, in a Variable and Constraint diagram, the white circles represent variables and the lines represent constraints. A term is represented by a constraint line traversing a variable circle. Lines that traverse a variable circle in a vertical way represent terms that have the '0' value predicate for that variable. Lines that traverse a variable circle in a horizontal way represent terms that have the 'X' value predicate for that variable. The variable circles are labeled with a letter of the Latin alphabet. The expression represented in FIG. 1 is identical to the expression represented in the following table:

Figure 1:
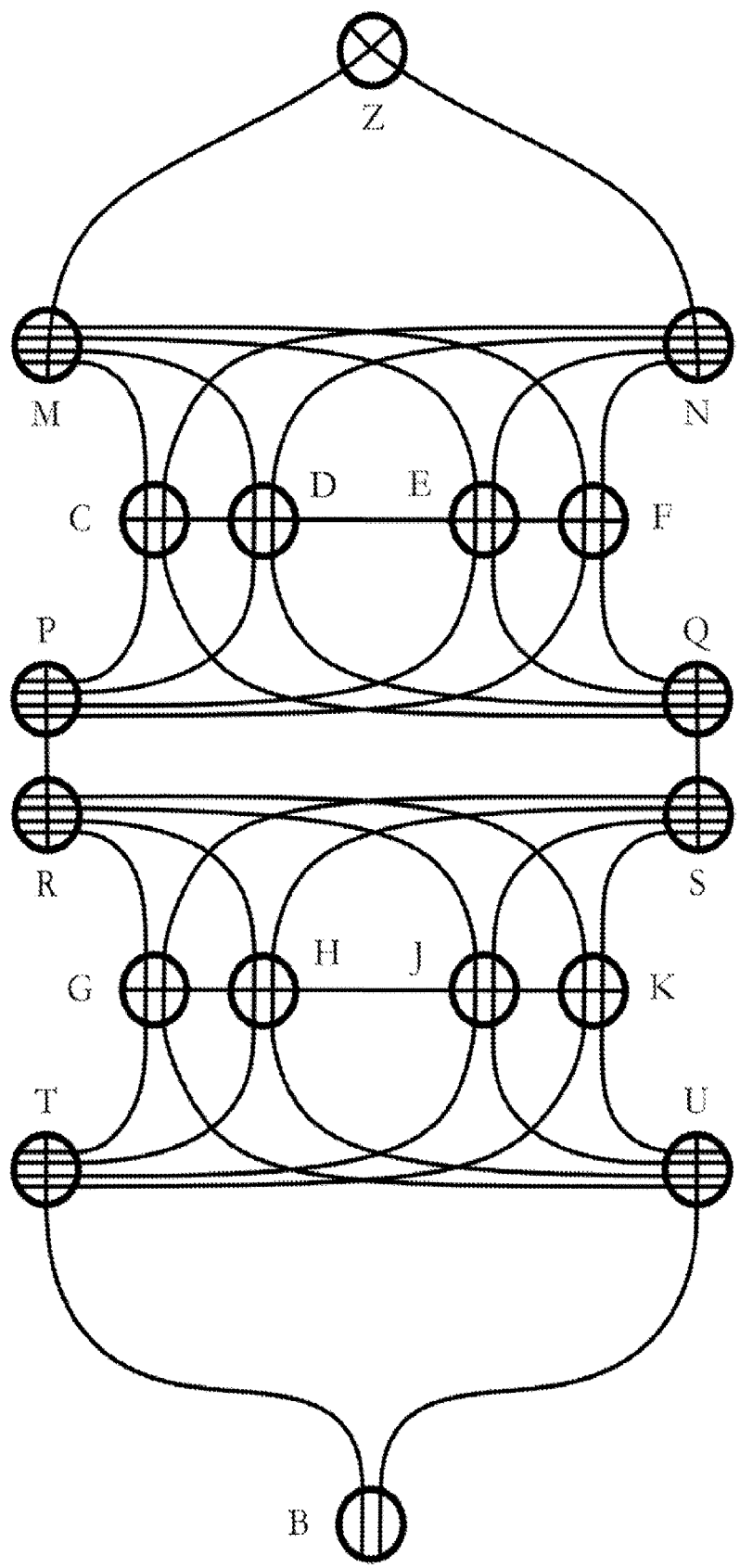
FIG. 1 shows a Variable and Constraint diagram that demonstrates by example that a process that parameterizes teardrops as summarizing constraints, as DPLL and CDCL do, is insufficient to avoid hyper-polynomial computational costs without some form of tuning.

|    | B | CDEF    | GHJK    | MNPQ    | RSTU    | Z |
|----|---|---------|---------|---------|---------|---|
| 1  | ○ | . . . . | . . . . | . . . . | . . ○ . | . |
| 2  | ○ | . . . . | . . . . | . . . . | . . . ○ | . |
| 3  | . | ○ . . . | . . . . | X . X . | . . . . | . |
| 4  | . | ○ . . . | . . . . | . X . X | . . . . | . |
| 5  | . | . ○ . . | . . . . | X . X . | . . . . | . |
| 6  | . | . ○ . . | . . . . | . X . X | . . . . | . |
| 7  | . | . . ○ . | . . . . | X . X . | . . . . | . |
| 8  | . | . . ○ . | . . . . | . X . X | . . . . | . |
| 9  | . | . . . ○ | . . . . | X . X . | . . . . | . |
| 10 | . | . . . ○ | . . . . | . X . X | . . . . | . |
| 11 | . | X X X X | . . . . | . . . . | . . . . | . |
| 12 | . | . . . . | . . . . | . . . . | ○ . ○ . | . |
| 13 | . | . . . . | . . . . | . . . . | . ○ . ○ | . |
| 14 | . | . . . . | ○ . . . | . . . . | X . X . | . |
| 15 | . | . . . . | ○ . . . | . . . . | . X . X | . |
| 16 | . | . . . . | . ○ . . | . . . . | X . X . | . |
| 17 | . | . . . . | . ○ . . | . . . . | . X . X | . |
| 18 | . | . . . . | . . ○ . | . . . . | X . X . | . |
| 19 | . | . . . . | . . ○ . | . . . . | . X . X | . |
| 20 | . | . . . . | . . . ○ | . . . . | X . X . | . |
| 21 | . | . . . . | . . . ○ | . . . . | . X . X | . |
| 22 | . | . . . . | X X X X | . . . . | . . . . | . |
| 23 | . | . . . . | . . . . | ○ . . . | . . . . | ○ |
| 24 | . | . . . . | . . . . | . ○ . . | . . . . | X |

The left-hand side of the table numerically labels the constraints that are unlabeled in the diagram, and the top of the table reiterates the labels of variables that appear in the diagram.

When xB is assumed, the following assertions are forced: oT, oU.

When xC, xD, xE, and xF are then assumed, no subsequent assertions follow.

When xG is then assumed, the following assertions are forced: xR, xS, oP, oQ, xM, xN, and either oZ or xZ. At this point, a contradiction exists in the logical expression. We will presume that the contradiction exists in constraint 23.

We now describe the behavior of an algorithm that parameterizes teardrops as summarizing constraints using stratified reasons:

The contradiction in constraint 23 has three assumptions in its reason, xB, xC, and xG. Because stratified reasons are being used, the precipitant of this teardrop must be in a path that contains xG. The identified precipitant in this case is xG itself. The summarizing constraint produced is a disjunct phrase containing the following terms: oB, oC, oG.

The consequence of removing the most recent assumption and the assertions it entails is that oG is asserted and no subsequent assertions follow.

When xH is then assumed, the following assertions are forced: xR, xS, oP, oQ, xM, xN, and either oZ or xZ. At this point a contradiction exists in either constraint 23 or 24 that has three assumptions in its reason, xB, xC, and xH. Because stratified reasons are being used, the precipitant of this teardrop must be in a path that contains xH. The identified precipitant in this case is xH itself. The summarizing constraint produced is a disjunct phrase containing the following terms: oB, oC, oH.

The consequence of removing the most recent assumption and the assertions it entails is that oH is asserted and no subsequent assertions follow.

When xJ is then assumed, the following assertions are forced: xR, xS, oP, oQ, xM, xN, and either oZ or xZ. At this point a contradiction exists in either constraint 23 or 24 that has three assumptions in its reason, xB, xC, and xJ. Because stratified reasons are being used, the precipitant of this teardrop must be in a path that contains xJ. The identified precipitant in this case is xJ itself. The summarizing constraint produced is a disjunct phrase containing the following terms: oB, oC, oJ.

The consequence of removing the most recent assumption and the assertions it entails is that oJ is asserted and this forces the following assertions: xK, xR, xS, oP, oQ, xM, xN, and either oZ or xZ. At this point a contradiction exists in either constraint 23 or 24 that has two assumptions in its reason, xB and xC. Because stratified reasons are being used, the precipitant of this teardrop must be in a path that contains xC. The identified precipitant in this case is xC itself. The summarizing constraint produced is a disjunct phrase containing the following terms: oB, oC.

The consequence of removing the most recent assumption and the assertions it entails is that oC is asserted and no subsequent assertions follow.

Following the pattern that is now established, the following summarizing constraints are produced: (oB, oD, oG), (oB, oD, oH), (oB, oD, oJ), (oB, oD), (oB, oE, oG), (oB, oE, oH), (oB, oE, oJ), (oB, oE), (oB, oG), (oB, oH), (oB, oJ), (oB). Further assumptions of C, D, E, F, G, H, J, and K do not produce any contradictions.

The variables C, D, E, and F have identical connections to other variables, and the same can be said for the variables G, H, J, and K. We can interpret the variables C, D, E, F, M, N, P, and Q as a block of variables and constraints that have internal connections that are congruent with the internal connections of G, H, J, K, R, S, T, and U, another such block; and we can interpret the cardinality of the sets {C, D, E, F} and {G, H, J, K} as the "size" of these blocks. These blocks are connected in series with an initial segment consisting of the constraints that contain terms of B, and a terminal segment consisting of constraints that contain terms of Z.

The number of summarizing constraints produced by this example is equal to the product of the sizes of the blocks. If the number of variables in the identically connected sets is varied, then the number of summarizing constraints produced continues to be the product of the sizes, as long as the block adjacent to the initial segment does not have its size reduced to 1. If additional blocks are inserted into the series, the number of summarizing constraints produced will be the product of the sizes of all the blocks, as long as B remains the variable of the first assumption, and as long as the block adjacent to the initial segment is always the last block in which assumptions are made. A product of block sizes is a hyper-polynomial number, and therefore the method used in the description above does not provide a solution without hyper-polynomial cost.

Given the same assumptions, regardless of order, embodiments of the present invention, which does not parameterize teardrops as summarizing constraints, will come to the conclusion that oB is unconditionally asserted with a single counter-reversal through Z rather than a number of traversals through Z that is the product of the sizes of the blocks. It is possible to construe, with some difficulty, that the example algorithm that produces summarizing constraints moves contradictions through a proximal space, but the transitions move contradictions from one teardrop directly to another, and each teardrop is such that if we also construe the assertion that results when the latest assumption is removed to be a counter-assertion, then it is always the case that such a counter-assertion no longer has the latest assumption in its reason. On the other hand, because embodiments of the present invention move contradictions contiguously through the same proximal space, they are able to detect relationships that the example algorithm misses or detects only after great effort, and this detection occurs specifically when the contradiction reverses through a point of former divergence which is not a precipitant such that the latest assumption is removed from the reason of the counter-assertion, or when a contradiction causes an assumption to be negated and counter-assertion or implication continues outside a single stratum.

There are embellishments to the discussed algorithm that produce summarizing constraints which may avoid a hyper-polynomial cost. One such embellishment is to apply assumptions to the initial segment and then to the blocks in order of their nearness to the initial segment. Such an embellishment requires prior analysis of the overall structure of an expression in order to decide, for example, which value predicates should become assumptions, and embellishments that require prior analysis are effectively tuning the algorithm to the specific structure of the expression. Other embellishments often do not work in all cases without prior analysis of the structure of an expression, which is why the Clay Mathematics Millennium Prize for this problem has not been awarded previously. Embodiments of the present invention include improvements that work in all cases without prior analysis of the structure of the expression.

DETAILED DESCRIPTION OF THE INVENTION

Embodiments of the present invention provide systems, methods, and/or devices for improving the performance of machines that solve problems in the complexity classes called "NP," "NP-complete," and "NP-hard".

"P" is a class of problems that can be solved by a deterministic Turing machine in polynomial time. A deterministic Turing machine engages in serial or limited parallel-processing. "NP" is a class of problems that can be solved by a non-deterministic Turing machine in polynomial time. A non-deterministic Turing machine is capable of unlimited parallel-processing. "NP-complete" is a subset of hard problems in NP whose membership in P is doubted. Examples of NP-complete problems are the Traveling Salesman Problem and the Satisfiability or satisfaction (SAT) Problem. NP-complete problems pertain to a number of technical fields. "NP-hard" problems are those problems which have a component that is known to be NP-complete but which have other components and those other components are tractable but otherwise are unclassified.

The conjunct normal form represents an expression as a list of conjunct ("ANDed") constraints where each constraint is composed of one or more disjunct ("ORed") logical terms. A "term" is a particular instance of a value assignment (usually "true" or "false") for a particular variable where the particular value assignment occurs in the context of a particular constraint. Therefore, a term is a value of a variable in the context of a particular constraint. The same value of the same variable in a different constraint represents a different term. It is known that the representation of any problem which is in NP has a conversion to a logical expression in conjunct normal form which does not incur a hyper-polynomial cost.

Computationally, space and time are polynomially exchangeable, so we talk generally about polynomial cost rather than specifically about polynomial time. Being able to determine the satisfiability of arbitrary conjunct normal form expressions in polynomial time with a deterministic machine is therefore equivalent to being able to solve any NP-complete or simpler problem without hyper-polynomial cost.

Prior to the present invention, solutions to NP-complete problems, as well as many other problems in NP, such as Integer Factoring, have either required an exhaustive search of possible value assignments for the variables represented in the problem, or otherwise required hyper-polynomial costs, such as N! or $3^N$, rather than polynomial costs such as $N^3$, where N is the size of the input to the problem. Embodiments of the present invention, in contrast, may find solutions to NP-complete problems, and other problems in NP, without requiring an exhaustive search of possible value assignments for the variables represented in the problem, and without otherwise requiring hyper-polynomial costs. Just as a multiplication circuit in a conventional computer permits the product of 255 and 37 to be computed in a number of elementary steps that is proportional to the number of bits in its registers (shift the result for each "zero" bit and add the first argument for each "one" bit in the second argument) rather than a number that is proportional to the value of the second argument (iterative add), which is a logarithmic reduction in computational cost, embodiments of the present invention permit a computer, whether conventional or purpose-built, to solve NP-complete problems or other problems in NP in a number of elementary steps that is less than a number that is proportional to the fifth exponent of the number of variables in the problem rather than a number that is hyper-polynomial. Embodiments of the present invention thereby enable a reduction in computational cost that is comparable to the reduction from linear to logarithmic cost.

One reason that computers were invented was to reliably and quickly solve difficult problems. Embodiments of the present invention, which may be implemented as computer processors and/or computers, provide a very significant improvement to automatic computing devices as well as to other machines that use computers to control their behavior. This improvement greatly reduces the amount of power, cooling, rent, and other costs that are required in order to establish and operate a computer while decisions are being computed, as well as reducing the time that operators of the computer must wait for a result. An automatic computing device that is augmented with embodiments of the present invention may no longer require to be programmed in a conventional way; instead, such a device or system accepts the set of constraints as the requirements to be met, whether those are structural or behavioral requirements, and the machine outputs a result or operates in a manner that satisfies those constraints.

One means by which embodiments of the present invention may deliver their improvements to the performance of computers and other devices that perform automated processes is by imposing a specific arrangement of switches within the computer and these switches rely on the physical property of exclusion. Exclusion among fermions is inherent in that no two fermions, or particles of the same type can occupy the same space at the same time; so forcing one particle into position may force another particle out of position, as when the teeth of one gear push against the teeth of another gear that is meshed with the first, thus switching the positions of both gears while only applying external force to one. Exclusion among bosons is inherent in the potentials we can engineer across carriers—we arrange that the potential is always either high or low, as in a transistor. Because many kinds of switches that operate on a variety of substrates are well-known, and the improvement provided by embodiments of the present invention is inherent in the arrangement of switches rather than the type of switch or substrate, language peculiar to specific kinds of switches is not used in the description of the present invention, and language that seems abstract, such as discussion of sets, orderings, or networks, is used because the language is precisely descriptive of the desired behavior for the arrangement of switches that is an embodiment of the present invention. This use of language is similar to how we may describe the structure of a gear, perhaps specifying the relative stiffness of the material out of which it is made rather than specifying whether it is made of wood or metal and without describing the carving or casting that might be used to produce the gear, because it is well known by practitioners of those arts how to produce the described object. This use of language is also similar to how we may describe a clockwork mechanism that is constructed out of a set of ready-made gears and springs in the vocabulary of rotational ratios and syncopation, without describing the details for constructing each of the ready-made parts, because we know that such parts are available, and how to mount those parts in order to produce the described effect is well-known to practitioners of the art. Yet none of this use of language obviates the fact that embodiments of the present invention may be implemented as machines and as methods that control machines, no matter how abstract the language that may be used to describe such machines and methods.

One embodiment of the present invention is a data processing system which solves given NP, NP-complete, or NP-hard problems using a deterministic machine in polynomial time. The given problem definition is converted into an expression composed of logical or otherwise deterministic constraints. Next, a process of assuming values for the constraint variables as-needed, tracking the paths of implications resulting from value assumptions, choosing one path for each value implicated, resolving any contradiction of a constraint by choosing a contradiction-causing value to be negated by using the path tracking to inform the decision, always negating a value asserted by a path that contains an assumption or pseudo-assumption, and then converting the contradicted constraint into an asserting constraint, is iteratively applied to the expression until either no contradicted constraints remain and every variable obtains a value, or else a contradicted constraint exists for which there is no value to be negated that is asserted by a path that contains an assumption or a pseudo-assumption. The number of iterations of each portion of this process is bounded by a polynomial of the size of the expression.

Embodiments of the present invention may be implemented as one or more devices and/or automated processes that process information in order to render decisions efficiently. The behavior of such embodiments may be explained using a system of objects, necessary relationships that contribute to the definition of what those objects are, and transformations that alter the states of those objects in ways that are consistent with the necessary relationships. Certain vocabulary used to describe embodiments of the present invention are described below.

Sets

The disclosure herein uses the mathematical language of "sets". Well-known operations that combine sets are "union" and "intersection". Well-known comparative operations between sets are "subset" and "superset". For clarity, "subset" and "superset" include the possibility that the two sets being compared are identical, whereas "proper subset" and "proper superset" exclude that possibility. The well-known concept of a "mapping" between sets is also briefly mentioned, as is a class of "set relation".

Variables

Each "variable" is a locale of variability, which can be characterized as a set of values. For example, each variable is the name of a logical predicate which appears in the given expression. In application, a variable could be the set of valid voltages supplied to a pin on a computer chip, a numeric register, an alphanumeric string in some programming language, or any data structure that has the property of representing one (or no) value at a time and can represent more than one value over time. In this respect, a variable here is similar to a variable in the domain of software engineering.

Values

The "values" of a variable, as used herein, are practically enumerable or practically delimitable. Problems that contain variable values that are not practically enumerable or delimitable might not be in NP. By definition, the values of Boolean variables are practically enumerable.

"Atomic values" are the indivisible mutually exclusive cardinal values of a variable. For a numeric variable X, "3" would be an atomic value, and "{2,3}" and "X<3" would not be atomic values.

Note that a variable could be defined as a logical predicate on a numeric variable that does not otherwise appear in the expression. In this case, the expression variable is Boolean not numeric, and the atomic values of the expression variable are "true" and "false", not numbers.

Value Predicates

"Value predicates" are statements that define a specific subset of atomic values of a variable. A set containing all atomic values of a variable is not a valid value predicate. A set containing no atomic values is not a valid value predicate. In other words, "null" and "inherent contradiction" are not valid values in the way of speaking used herein. For example, "X=3", "X>3", "2<X<3", "X modulo 2=1", "X∈{2,3}", and "X=complement(2<N<3)" (when N does not refer to a variable of the expression, as defined here, but to a para-variable strictly used to independently define a value predicate) are all valid value predicates for a numeric variable, while "X=Y", "1<X<0", and "X=complement (1<N<0)" are not valid value predicates.

When we write about a conjunction of predicates, this is identical to an intersection of the sets of atomic values represented by the predicates.

In all cases where we describe behavior in the vocabulary of values of variables, we are describing the behavior of switches. We may interpret a switch state or the states of an ordered or unordered collection of switches as a "number", a "Boolean value", or a "predicate", and this is often the engineering intent, but it is merely a descriptive convenience—the behavior that is described is the behavior of switches and not of numbers, sets, or logical states per se.

Terms

A "term" is primarily composed of a reference to, or a reproduction of, a variable within the context of a constraint. An explanation of "constraint" is provided farther below.

Certain embodiments of the present invention may be embedded in a system that is interpreted as using two-valued logic. In two-valued logic, a term is typically interpreted as representing a Boolean value of the variable. This is a short-hand for a claim that the term effectively represents a value of the term's variable that is interpreted to be either "true" or "false" for logical models, or either "1" or "0" for digital numeric models, or "high-voltage" or "low-voltage" for transistor circuits, or even as (for example) either "hug" or "kiss" for a thoroughly abstract model. The imperative for two-valued logic is that there is no third value and, therefore, in order that there be a problem to solve, the two values must disagree, regardless of what names we give to the values. We call such a term a Boolean value predicate.

Certain embodiments of the present invention may be embedded in a system that is interpreted as using many-valued logic. An example of a many-valued logic is first-order logic, which includes representations of numbers. In many-valued logics, a term may represent a Boolean value as in two-valued logic, but it may instead represent a value of some variable that is not the subject of an explicit predicate. When representing a value of such a variable, we call such a term a non-Boolean value.

Instead of representing any specific set of values, a term in a many-valued logic may be part of an equality or inequality relationship with other variables. In order for a term to be part of an equality or inequality relationship with other variables, the relationship must meet special requirements. An explanation of these special requirements is provided in the discussion of SOMMEs below.

Regardless of whether an embodiment is interpreted as using two-valued logic or many-valued logic, there may be many terms in the expression, each referencing the same or different variables.

Phrases

A "phrase" contains an addressable set of terms representing value predicates. A phrase contains any number of terms, but for each term in the phrase, there may be no other term that represents a value predicate of the same variable. Each phrase also represents either a conjunction or disjunction of the value predicates it contains. A numerically represented vector is an example of a conjunct phrase, and a CNF constraint is an example of a disjunct phrase.

Constraints

In two-valued logic, a "constraint" is represented by a non-empty disjunct phrase of Boolean terms. In multi-valued logics, a constraint may be represented by either a disjunct phrase or a satisfiable-or-mutually-mapped expression (SOMME).

SOMMEs

A "SOMME" is a sub-expression which represents a relationship among variables such that determining the values of all but one of the variables in the sub-expression either satisfies the sub-expression or else implies the truth of a value predicate for the one variable which was not previously determined, regardless of which variable is the one not previously determined, and regardless of the specific determined values. For example, if R is the set of real numbers, and x, y, z∈R, then "x+y=z" is a SOMME, but "x*y=z" is not because if, for example, x=0 and z=0 the value of y could be any number and remains unknown. However, "x=0 OR y=0 OR x*y=z" is a SOMME because it removes the possibility of one of the factors being 0 unless the entire statement is satisfied. Similarly, "$x^3$=y" is a SOMME, and "x<0 OR y<0 OR $x^2$=y" is also a SOMME, but "$x^2$=y" is debatable.

In the case of "$x^2$=y", when y is determined to be a single atomic value in the Real numbers, x could be either the positive square root of y or the negative square root of y. If we accept only atomic values as implied values, then "$x^2$=y" is not a SOMME, but if we permit sets to be implied values then "$x^2$=y" is a SOMME. What values are allowed to be implied is a decision that may be inherent in the definition of the problem to be solved; so after this point, the terminology used is that "value predicates" are implied, and this terminology permits either interpretation of what constitutes a SOMME.

In the case of "x=0 OR y=0 OR x*y=z", if a determinant for y exists so that y=1, and then a determinant for x is introduced so that x=0, there is no assertion for z because the first part of "x=0 OR y=0 OR x*y=z", i.e. "x=0", is not restricted. This is what is meant by "satisfying the sub-expression".

Disagreement

Value predicates of the same variable which have an empty set of atomic values in their intersection are said to "disagree".

Complementariness

One set of value predicates is "complementary" to another set of value predicates for the same variable if no predicate in either set disagrees with the other predicates in the same set, the intersection of the first set disagrees with the intersection of the second set, and every atomic value of the variable is in either one set or the other exclusively. In two-valued logic, each variable value is complementary to the only other possible value for that variable and disagrees with it.

Uncontroversiality

If, for one variable, the conjunction of all the value predicates represented in all the constraints do not disagree, and there are no SOMMEs that have terms of that variable, then the variable of those terms is said to be "uncontroversial".

Determinants

When a conjunction of value predicates is considered to be true, whether provisionally (a.k.a. "conditionally") or necessarily (a.k.a. "unconditionally"), we call the set of atomic values that result from the conjunction a "determinant".

Restriction

We say that a determinant restricts the value of a term in a disjunct phrase if the determinant disagrees with the term.

We say that a determinant restricts the value of a term in a SOMME if the SOMME has a term of the same variable and any of the following three cases applies:

not all terms in the SOMME represent variables that have determinants, and this determinant does not satisfy the SOMME; or as a consequence of this determinant, the SOMME implies a non-tautological value predicate for a variable other than the variable represented by this term; or all terms in the SOMME represent variables that have determinants, and if the given determinant did not exist, the SOMME would imply a value predicate for the variable represented by the term of the same variable as the given determinant, but that value predicate would disagree with the given determinant.

Assertions

When determinants restrict all but one of the terms in a constraint, a value predicate is "asserted" for the variable of the one unrestricted term. If all the restricted terms of a constraint are unconditionally restricted, then an assertion of that constraint imposed by those restrictions is trivially unconditional. Also, if a constraint contains only one term, the value predicate represented for that term is trivially unconditionally asserted. Otherwise, if any of the terms of a constraint is not unconditionally restricted, but the constraint asserts a value predicate, that assertion is conditional. When some constraints contain terms that represent value predicates that represent sets of atomic values with more than one member, it is possible for a constraint to unconditionally assert a first value predicate and to conditionally assert a second value predicate that is a proper subset of its unconditional assertion.

A constraint may continue to have a conditional assertion even after one or more of its conditional restrictions are removed. Unconditional restrictions cannot be removed.

Restriction Support

Extant assertions that represent the same variable are said to "conjunctively converge", and the intersection of the value predicates represented by the extant assertions is the extant determinant for that variable. If a given class of extant assertions conjunctively converge to produce a determinant that represents a set of atomic values that is a subset of the restriction on a term, then the given class of assertions is said to "fully support" that restriction.

Prevalence

Conjunctions of assertions (a.k.a. intersections of sets of atomic values represented by the value predicates that are asserted) become the determinants for their common variable.

Many constraints may assert a single atomic value or another value predicate that represents a set of multiple atomic values for the same variable. When the constraints of an expression do not contain value predicates that represent sets of atomic values with more than one member for the same variable, such as when two-valued logic applies, then at most one of the assertions of that same variable is "prevailing". Otherwise, it is possible to have multiple prevailing assertions for the same variable.

Usually the assertions in the conjunction that composes a determinant are prevailing assertions. In the case of unconditional assertions, the assertions are usually prevailing. Among prevailing unconditional assertions for the same variable, the intersection of sets of atomic values represented by the value predicates of those assertions becomes the unconditional determinant. Among conjunct conditional assertions for the same variable, the intersection of the sets of atomic values represented by the value predicates of those assertions and the prevailing unconditional assertions becomes the conditional determinant. The determinants are updated each time an assertion is added to the conjunction. Assertions are usually added to the conjunction when they become prevailing.

When only one prevailing assertion is allowed for each variable, any unconditional assertion for that variable is the one that prevails. When only one prevailing assertion is allowed for a variable, and there are no unconditional assertions for that variable and there are multiple conditional assertions that could be prevailing, then the choice of which assertion to designate as prevailing is arbitrary and is most easily rendered by taking the first such assertion that presents itself. (See farther below for a discussion of conditional assertions that cannot become prevailing regardless of what other assertions exist.)

When more than one prevailing assertion is allowed for each variable, then the assertions should be segregated according to their conditionality, as described below.

Among unconditional assertions that are candidates for being designated as prevailing, the first such assertion that presents itself should be made prevailing. If a subsequently presented unconditional assertion for the same variable represents a proper subset of the atomic values contained in any value predicates represented by previously presented prevailing unconditional assertions, then those previously presented assertions usually become non-prevailing and the subsequently presented assertion always becomes prevailing. If a subsequently presented unconditional assertion does not represent a subset of any of the previously presented prevailing unconditional assertions, and the intersection of the subsequently presented unconditional assertion with the intersection of the previously presented prevailing unconditional assertions is a proper subset of the intersection of the previously presented prevailing unconditional assertions, then the subsequently presented assertion becomes prevailing. In all other cases, a subsequently presented unconditional assertion usually does not become prevailing. It is acceptable, though less efficient in many cases but more efficient in a few cases, to ignore these rules and make all unconditional assertions prevailing.

If a subsequently presented unconditional assertion represents a value predicate that is a subset of the value predicate for a previously presented prevailing conditional assertion for the same variable, then the previously presented conditional assertion may (but need not) become non-prevailing. Similarly, in cases above where unconditional assertions usually become non-prevailing but in fact remain prevailing, the efficiency of the present invention is reduced but not to the point that it becomes hyper-polynomial. The discussions below presume that such assertions become non-prevailing.

Among conditional assertions that are valid candidates for being designated as prevailing when no unconditional assertions for the same variable exist, the first such assertion that presents itself should be made prevailing. If the intersection of the set of value predicates represented by a subsequently presented valid candidate conditional assertion and the intersection of the previously presented prevailing unconditional and conditional assertions for the same variable is a proper subset of the intersection of the previously presented prevailing unconditional and conditional assertions, then the subsequently presented assertion becomes prevailing. In all other cases, a subsequently presented conditional assertion does not become prevailing. (Invalid candidates for being designated as prevailing are discussed farther below.)

As each assertion becomes prevailing, it may be associated with the next number in a sequence. This number is called the "prevalence" number of the assertion.

Assumptions

During processing, we may create one or more assertions that are not produced by constraints and which are for a variable that previously had no determinant, or has a determinant but the determinant represents a set containing more than one atomic value. Such an assertion is called an "assumption" or an "assumptive assertion" and its value predicate is "assumptive". In contrast, assertions that are forced from constraints are called "implicated assertions". Assumptions are always conditional, and each value predicate must contribute to the determinant for the variable the assumptive value predicate represents.

In some embodiments of the present invention, it is possible to make assumptions implicitly rather than explicitly. For example, if constraints are organized into groups, where each member of a group has some terms that represent value predicates that are in a certain set of value predicates that identifies that group, and this organization exists in order to compare the productive interaction of other terms in the same constraints that represent value predicates or variables that are not in this certain set, then the organization of constraints effectively assumes common restrictions on the terms in each set of common value predicates.

Contradictions

When all the terms of a constraint are restricted, there is a "contradiction" in the constraint. An expression is unsatisfiable if it contains any constraint that has all of its terms unconditionally restricted.

Satisfaction

Any constraint is "satisfied" when one or more of its terms is not restricted and the variable of that term has a determinant. An expression is satisfied when none of its constraints are contradicted and all variables have determinants that represent a set containing a single atomic value.

In cases where sets of atomic values are acceptable as value predicates, it is possible that the expression may be satisfied when all constraints are satisfied and all variables have determinants, not requiring that each determinant represent a set containing a single atomic value, but whether this is the case or not depends on the specific qualities of the expression. Generally, if an expression contains any mapping of two sets that is a reordering of another direct or indirect mapping of the same two sets, then the expression should be treated as requiring single-value predicates for expression satisfaction.

Pools

A "pool" is an addressable set to which elements can be added and removed. As a pool per se, elements may be added to or removed from the pool in any order. Pools may also incorporate specific rules for the order in which added elements are removed. For example, non-prioritized queues incorporate a "first-in-first-out" (FIFO) rule, and stacks incorporate a "first-in-last-out" (FILO) rule.

Both stacks and queues are specific kinds of pools. Stacks have elements "pushed" down onto them and "popped" off of them. In the case of queues, elements are "enqueued" and "dequeued". Initially, all pools are empty, and when the last element has been popped off a stack or dequeued from a queue, the pool is again empty.

Implication

"Implication" is a process that is triggered when a new determinant is introduced. In this process, the terms that are restricted by the new determinant are identified, and then the constraints of those terms are checked to see if all or all but one of the terms in each constraint is restricted.

If a constraint is not satisfied and all but one of the terms in the constraint are restricted, then the constraint asserts a value predicate. New assertions may or may not become prevailing, as described above. If a new assertion becomes prevailing, then a new determinant is introduced and these steps are repeated. Because many assertions may be produced from the introduction of a single determinant, it is necessary for an implication process either to have a pool to manage the assertions and resultant determinants or to have a mechanism that provides parallel paths of operation.

Implication may halt as soon as a constraint becomes contradicted and always halts when no new prevailing assertions were produced in the most recent iteration of the implication process.

For efficiency, whenever a first unconditional determinant is introduced to the expression, any other unconditional assertions that may be forced by the first unconditional determinant should be propagated through the expression before any further conditional implication or other action that may introduce another conditional determinant occurs.

Proximity in Rhizomatic Networks

The propagation of implication is founded on the notion of restriction, which can only be productively conveyed between any two constraints where each constraint contains terms that represent value predicates for the same variables as are represented by terms in the other constraint, and among these terms exactly one term restricts the term that represents the same variable in the other constraint. In two-valued logic, this means that exactly one term represents a value predicate that disagrees with the value predicate of the matching term in the other constraint, and all other predicates either have no matching terms that represent the same variable or else the other predicates represent the same value predicate as is represented by its matching term.

In the case of the mutually-mapped portions of SOMMEs, the same relationship is necessary in order to be productive (i.e., a single term in one constraint may restrict a single term in another constraint), but this fact is usually obscured by a presumption that no SOMME in an expression represents a subset of the mapping represented by another SOMME in the expression. When this presumption is correct, all SOMMEs that are not satisfied that have terms that share common variables have a productive relationship, but it is the singular nature of the restriction that makes the relationship productive, not the singular or multiple nature of the commonality of variable.

The structure that is made apparent by the collective implicational exercise of these pair-wise productive relationships provides two forms of convergence. Two assertions may converge conjunctively by representing non-disagreeing value predicates for the same variable. Two assertions may converge disjunctively by restricting different terms in any single constraint which then asserts some other value predicate. Among assertions that conjunctively converge, assertions that are not subsets of other assertions are usually made prevailing. Among assertions that disjunctively converge, all are prevailing before they converge.

Because the implicational structure is produced by two different forms of conjunction, it would be imprecise, though not incorrect, to call the structure partially ordered, a collection of lattices, or a conventional network. Instead, we call the implicational structure a "rhizomatic network" in order to emphasize that operations that have been defined to work on conventional networks may be analogous to operations that are defined to work on rhizomatic networks, but the mechanical specifics and increased number of functional cases that must be handled by some operations of the present invention that work on rhizomatic networks make these operations significantly different from the analogous operations that have been defined to work on partially ordered sets or conventional networks.

Two constraints that have a productive relationship, as described above, and for which the assertion of one constraint actually restricts a term in the other constraint are said to be "contiguous" in the implicationally apparent rhizomatic network. Proximity, as the word is used here, is founded on distance across the contiguous constraints in an implicationally apparent rhizomatic network, and the space defined by extended contiguity is a proximal space.

Handling Contradictions & Assumptions

Some method of direct reference between terms and variables and constraints should be implemented. In software, this is normally accomplished by creating indexes. In electronic hardware, this may, for example, be accomplished with wiring.

Constraints that contain terms that represent uncontroversial variables can be safely removed.

Any constraint that contains only one term constitutes an unconditional assertion of the value predicate represented by the term. Whenever a new unconditional assertion is recognized, implication should occur.

If implication has halted and there are no contradicted constraints, then an assumption should be created for a variable that has no determinants, or if all variables have determinants, an assumption should be created for a variable that has a determinant that represents a set containing more than one atomic value which reduces the cardinality of the set represented by the determinant, and then implication should occur.

If implication has halted and there are one or more contradicted constraints, then one contradiction should be resolved in some fashion, and then implication should occur. This step should be repeated until either there are no more contradicted constraints or an unconditional contradiction exists.

All the above steps should be repeated until a necessary contradiction exists, in which case the expression is unsatisfiable, or else until the expression is satisfied.

Resolving a Contradiction

If all of the terms in a constraint are restricted, a contradiction exists in the constraint. If all the terms of a contradicted constraint are unconditionally restricted, then a necessary contradiction exists, and the expression is unsatisfiable, and processing ceases. If some terms of a contradicted constraint are not unconditionally restricted, then the contradiction may be resolved and processing continues.

Behaviors of Embodiments of the Present Invention

The following describes behaviors of embodiments of the present invention, and especially how contradictions are resolved according to embodiments of the present invention.

Problems that are in NP, NP-complete, or NP-hard cannot be solved by deterministic machines unless assumptions are made either explicitly or implicitly. In order that a general algorithm may solve such problems without incurring hyper-polynomial costs and without the need for the algorithm to be tuned to accommodate each specific instance of the problem, the algorithm may exhibit certain behaviors.

Behavior #1

One behavior ("Behavior #1") that may be exhibited by an algorithm to solve problems in NP, NP-complete, or NP-hard without incurring hyper-polynomial costs and without the need for the algorithm to be tuned is such that, when contradictions are found in the rhizomatic networks that are made apparent by the implication of assumptions, these contradictions are moved through the networks in an attempt to assert a value predicate for a term where there is no disagreeing value predicate that is asserted, in order to satisfy all the constraints in the prevailing paths that lead to the contradiction.

Algorithms that rely on random variations of a putative solution, such as Genetic Algorithms, do not identify the case when there is no solution set at all and are susceptible to performing meandering variations indefinitely when the solution set is small. Algorithms that parameterize contradictions in order to create new summarizing constraints consisting of an indeterminate number of terms risk producing hyper-polynomial numbers of constraints when the order in which assumptions are chosen happens to be pathological or the ordering that determines which assertion becomes prevailing among assertions of identical value predicates happens to be pathological. Avoiding the pathological orderings in algorithms that create summarizing constraints is what tuning should provide; so to provide non-hyper-polynomial cost solutions without tuning, Behavior #1 resolves contradictions while avoiding the creation of new summarizing constraints with an indeterminate number of terms and without relying on random variations.

In order to describe the motion of contradictions within the rhizomatic network, the following additional definitions are provided.

Destinations

In certain embodiments of the present invention, assumptions are non-prevailing but do contribute to the determinant for the variable that the assumption represents. A term that was restricted, but for which there are no extant prevailing assertions that conjunctively converge to produce a determinant that represents the restriction, is either restricted by an assumption or was restricted by a prevailing assertion but that assertion has been subsequently removed, or is restricted in part by an implicated assertion that is not prevailing. Each contradiction must be moved toward a term that is restricted by an assumption or toward some other term for which the recorded restriction is not fully supported by prevailing assertions that are part of a prevailing path that leads to and produces the contradiction. Terms for which the recorded restriction is not fully supported by prevailing assertions are called "destinations", and destinations that are not fully supported by the conjunctive convergence of extant prevailing assertions and assumptions are called "pseudo-assumptions".

Counter-Assertions

The movement of each contradiction occurs by "counter-asserting" a value predicate for a conditionally restricted term that is in the contradicted constraint.

Negating

Counter-asserting resolves the contradiction in one constraint and may "negate" some assertions that contributed to the determinant for the variable represented by the counter-assertion. Negation of an assumptive assertion eliminates the assumption. Negation of an implicated assertion or counter-asserted assertion removes the assertion itself and creates a contradiction in its constraint.

A counter-assertion may also provide a restriction in a constraint that was not asserting and produce an implicated assertion from that constraint.

Motion of Constraints

Any constraint that provided an assertion of a value predicate that represents the variable for which another value predicate is counter-asserted and that disagrees with the counter-asserted value predicate or disagrees with the intersection of the counter-asserted value predicate and other assertions that contribute to the determinant for that variable is negated, thus moving the contradiction from the counter-asserting constraint to contiguous constraints that provided disagreeing assertions. When a destination assumption is negated, or when a value predicate is counter-asserted for a term that was recognized as being restricted but the restricting determinant is not fully supported by prevailing assertions, no contradiction exists in the constraints that embody the prevailing paths of the former contradiction; and as long as Behavior #3 is provided, the contradiction is expelled from the recorded prevailing path of the contradiction, and the expression as a whole may become satisfied if new paths of implication or counter-assertion are not created or found by the negation of an assumption and other contradictions are already expelled.

Behavior #2

Another behavior ("Behavior #2") that may be exhibited by an algorithm to solve problems in NP, NP-complete, or NP-hard without incurring hyper-polynomial costs and without the need for tuning is: (1) for the algorithm to recognize the case in which the counter-asserted value predicate should be unconditional, and (2) for the algorithm not to incur a hyper-polynomial cost in order to recognize when a counter-assertion should be unconditional. Trivially, a counter-assertion must be unconditional if all but one of the terms in the contradicted constraint is restricted unconditionally, and there may be circumstances where conventional mathematical analysis requires that SOMMEs unconditionally counter-assert a value predicate regardless of the existence of destinations; but a counter-assertion of a value predicate for a term in a constraint should also be unconditional when the path of the putative counter-assertion, excluding the sub-paths that provide the prevailing assertions that are putatively negated by the counter-assertion, does not contain any destinations.

An algorithm that fails to recognize that the expression cannot be satisfied by negating a counter-assertion that should be recognized as being unconditional may retrace a portion of its path an infinite number of times when a problem expression is non-trivially unsatisfiable.

Behavior #3

Another behavior ("Behavior #3") that may be exhibited by an algorithm to solve problems in NP, NP-complete, or NP-hard without incurring hyper-polynomial costs and without the need for tuning is such that the value predicate counter-asserted must not only resolve the contradiction in the counter-asserting constraint, it must also not create a contradiction in any of the constraints in the prevailing path that leads to and produces the counter-assertion, excluding constraints that provided assertions that are specifically negated by the counter-assertion. This behavior requires that the decision of which value predicate to counter-assert has information about the prevailing path leading to and producing the counter-assertion.

If it is possible that a counter-asserted value predicate creates a contradiction in one or more of the constraints that are in the prevailing path of the counter-assertion, then it is possible that a revision loop may occur that revises the counter-asserted value predicate with a number of loop iterations that is indeterminate, and thus hyper-polynomial, as is the case in approximating algorithms such as the Interval Newton method.

When many-valued logic is not used by the expression, any conditionally restricted term in the contradicted constraint may be counter-asserted according to the rules of implication, and that counter-assertion is guaranteed to not create contradictions in the constraints in the prevailing path that leads to and produces the counter-assertion.

Behavior #4

Another behavior ("Behavior #4") that may be exhibited by an algorithm to solve problems in NP, NP-complete, or NP-hard without incurring hyper-polynomial costs and without being tuned is such that when multiple paths have equal potential to satisfy the expression by expelling a contradiction, the manner by which the term that is in the contradicted constraint for which a value predicate is to be counter-asserted is chosen must be such that the motion of the contradiction does not retrace paths with a hyper-polynomial number of iterations of the same path nor a hyper-polynomial number of variations of paths.

Advantages

Embodiments of the present invention may exhibit any one or more of Behavior #1, Behavior #2, Behavior #3, and Behavior #4, each of which may be implemented using a device, software, or automated process, in any combination. Embodiments of the present invention may be implemented to improve the functioning of a computer itself by providing the benefits described above. Such embodiments achieve their beneficial results using the novel and nonobvious techniques disclosed herein, and therefore do not merely constitute an instruction to apply an abstract idea or to implement an abstract idea on a computer. Embodiments of the present invention which take the form of an improved computer (or one or more components thereof, such as an improved processor) include novel and nonobvious components, such as novel and nonobvious circuits for performing the novel and nonobvious functions disclosed herein. Such novel and nonobvious circuits, by virtue of being novel and nonobvious, are not generic computer components, but instead are components which, as a whole, are unique to embodiments of the present invention, even if they include certain subcomponents (such as certain logic gates) which are known to those having ordinary skill in the art.

Collectively, the four behaviors listed above are sufficient to solve problems in NP, NP-complete, or NP-hard without incurring hyper-polynomial cost and without tuning. Providing an algorithm that exhibits all four behaviors, even for two-valued logic alone, amounts to proof that P=NP. Considering that the question of whether or not P=NP was formally posed in 1970 and has remained unsolved until now, despite a very significant prize being offered by the Clay Mathematics Institute starting in 2000 and the existence of many regularly scheduled international and regional contests where entrants attempt to solve such difficult problems in minimal time, every device, computer program, or automated process that provides these four behaviors is evidently non-obvious, regardless of what fragmentary technical components exist in the prior art.

Exhibiting Behavior #1

Counter-assertion exhibits Behavior #1. It is efficient for contradictions to be resolved in certain sequences. The resolution of one original contradiction is best followed by the resolution of the contradiction produced in a constraint that provided one of the prevailing assertions that were negated by the counter-assertion produced from the original contradicted constraint and so on. The contradictions may be resolved in other orders, but resolving them in this order reduces the number of revisions of the possible means of tracking the paths of prevailing assertions that would otherwise be necessary to providing rigorous accuracy in these tracking elements.

With rigorously maintained records of the prevailing paths that lead to and produce assertions and counter-assertions, only one such record is needed per asserted value predicate. Without rigorously maintained records, it may be necessary to store a history of all past and present assertions of a specific value predicate or rely on a method that allows dithering to revise the relevant records, as is described farther below. (Explanation of rigorous and lazy maintenance of records is provided farther below, after the nature of those records has been discussed.)

Persistence of Assertions

When a first conditional prevailing assertion is such that it was forced by restrictions on the terms of its constraint where those restrictions relied upon other prevailing assertions for support and one or more of those other prevailing assertions have been negated, then the first prevailing assertion may continue to persist. In general, it is better for assertions to persist unless they are explicitly negated, because this eliminates the work of removing and re-propagating assertions; but persistence is not required.

Exhibiting Behavior #2

It is necessary to exclude the sub-paths of negated prevailing assertions from the path of a counter-assertion in order to exhibit a behavior that recognizes when a counter-assertion should be unconditional in a non-trivial situation, and this exclusion can be facilitated by tracking the paths that lead to prevailing assertions. Tracking the paths of prevailing assertions is part of the prior art, but some embodiments of the present invention augment the tracking that is in prior art by adding certain elements to the tracking data structure.

Full Reasons of Implicated Assertions

In certain embodiments of the present invention, each prevailing assertion records a "full reason" that contains the value predicates of previous assertions that restricted terms in the constraints of the prevailing paths that led to and produced the current prevailing assertion, and each value in a full reason is augmented with counts. One such count is the "fulfilled" count.

To explain how the fulfilled count accrues during implication when there are no other counts:

an assumption has an empty full reason; and
a candidate implicated prevailing assertion has a full reason that contains the union of the set of value predicates in the full reasons for all extant prevailing assertions that are not unconditional and which conjunctively converge to produce determinants that restrict terms in the constraint from which the candidate assertion derives, unioned with the set of value predicates of the assertions that are not unconditional and which restrict terms in the constraint from which the candidate assertion derives; and
when a specific value predicate in the full reason of the candidate assertion derives from exactly one of the unioned previously populated full reason, then the fulfilled count for that value predicate is inherited from the previously populated full reason from which it derives; and
when a specific value predicate in the full reason of the candidate assertion derives from a previously populated full reason and is shared between two or more of these unioned previously populated full reasons, then the fulfilled count is the sum of the corresponding fulfilled counts derived from previously populated full reasons; and
when a specific value predicate in the full reason of the candidate assertion does not derive from any of the unioned previously populated full reasons, the fulfilled count for this value predicate is initialized as being equal to zero; and
the fulfilled count for any value predicate in the full reason of the candidate assertion is incremented by one for each value predicate in the set of value predicates of the assertions that are not unconditional and which restrict terms in the constraint from which the candidate assertion derives.

The fulfilled count is a way of encoding predecessor prevailing assertions in prevailing paths that led to and produced a single resultant first prevailing assertion. The counts in this encoding permit the prevailing path of a second prevailing assertion to be subtracted from the full reason of the first prevailing assertion without removing any sub-paths that may be common to the prevailing paths of other prevailing assertions that led to and produced the first prevailing assertion. This capability is useful for the proper analysis of the prevailing paths of restricting prevailing assertions in order to decide which restricted terms may be counter-asserted and which counter-assertions must be unconditional.

Farness Counts

Behavior #2 may be exhibited by some means that provides an ordering of the restricted terms that are in the path that leads to and produces a counter-assertion so that, when accessed in either ascending or else descending order, a candidate assertion in the path is always encountered (by way of the term ordering) before encountering any of the assertions that led to and produced that candidate assertion. "Farness counts" provide such an ordering. Farness counts or some other means of providing this ordering may be employed to exhibit Behavior #2. "Maximum distance counts" and carefully maintained prevalence numbers are considered to be farness counts. Insofar as prevalence numbers may be used as farness counts, the language used when referring to the ordering of farness counts will assume that ascending order of farness counts indicates increasing farness, even though the descending order typically provides such an ordering for prevalence numbers.

Each maximum distance count records the maximum distance between a resultant conditional prevailing assertion and each value predicate in the full reason of the resultant assertion, where "distance" in this context reflects the number of implicational or counter-assertion steps between value predicates and the resultant conditional prevailing assertion. In certain embodiments of the present invention, the maximum distance counts in the full reason for a non-assumptive resultant conditional prevailing assertion are constructed as follows:

When the full reason of the resultant assertion is being accrued, all the maximum distance counts that derive from the full reasons of previous assertions are incremented by one, and value predicates that do not derive from a full reason are given a maximum distance count equal to one, and then the single maximum distance count that is the greatest among all the maximum distance counts for the same value predicate in the union that produces the set of value predicates in the full reason of the resultant is identified and assigned as the maximum distance count for the corresponding value predicate in the full reason of the resultant assertion. (Assumptions have no full reasons and therefore can have no distance counts in their putative full reasons.)

Unfulfilled Counts

A non-necessary count that may be used by embodiments of the present invention is the "unfulfilled" count. When unfulfilled counts are used, the manner of accruing the fulfilled count is different than described above, but the manner of accruing the maximum distance counts is the same as above.

To explain how the unfulfilled count accrues and how the fulfilled count accrues when unfulfilled counts are used in the full reason of a given implicated conditional prevailing assertion:

(This process description, as well as others farther below, includes bracketed statement labels such as "[U1]". These labels uniquely identify the statements and explicitly reiterate the nesting of statements relative to qualifying statements that is normally indicated by indenting of text in pseudo-code. Without an indication of nesting, the description may be interpreted ambiguously.)

[U1] The "basis" of the resultant full reason is initialized as empty.

[U2] If there is exactly one implicated conditional prevailing assertion that restricts a term in the constraint of the given assertion:
  [U2a] The contents of the full reason of this one implicated conditional prevailing assertion is copied as the basis; and the value of the assertion itself is added to the basis, and that value is associated with a fulfilled count of one and an unfulfilled count of zero.

[U3] If there is more than one implicated conditional prevailing assertion that restricts one or more terms in the constraint of the given assertion:
  [U3a] The content of the full reason of one implicated conditional prevailing assertion is copied as the basis and this prevailing assertion is then ignored by further processing.
  [U3b] For each candidate implicated conditional prevailing assertion that restricts a term in the given constraint and which is not yet ignored by further processing:
    [U3b1] If the value predicate of the candidate assertion appears in the basis:
      [U3b1a] Increment the unfulfilled count for the value of the candidate assertion in the basis by one, and the candidate assertion is ignored by further processing.
    [U3b2] Otherwise:
      [U3b2a] Copy the full reason of the candidate assertion as the "co-basis".
      [U3b2b] For each candidate value predicate in the co-basis that has a non-zero fulfilled count, in ascending maximum distance count order:
        [U3b2b1] If the candidate value predicate appears in the basis, subtract the fulfilled and unfulfilled counts associated with all value predicates in the full reason of the prevailing assertion of the candidate value predicate from the co-basis, and subtract one from the fulfilled count of the candidate value predicate in the co-basis, and add one to the unfulfilled count of the candidate value predicate in the co-basis.
        [U3b2b2] Remove every value predicate that has fulfilled and unfulfilled counts that are both zero from the co-basis.
      [U3b2c] Add the value predicates in the co-basis to the basis where they do not already exist, and add the fulfilled and unfulfilled counts from the co-basis to the corresponding fulfilled and unfulfilled counts in the basis, and add the value predicate of the candidate assertion to the basis with a fulfilled count of one and an unfulfilled count of zero, and the candidate assertion is ignored by further processing.
  [U3c] For each value predicate of an assumption or a conditional non-prevailing assertion that contributes to the determinants that restrict one or more terms in the given constraint:
    [U3c1] If the value predicate of the candidate assertion appears in the basis:
      [U3c1a] Increment the unfulfilled count in the basis that is associated with the value predicate of the candidate assertion by one.
    [U3c2] Otherwise:
      [U3c2a] Add the value predicate of the candidate assertion to the basis, associated with an unfulfilled count equal to one.

[U4] Use the basis as the full reason of the assertion of the given constraint.

The method of accruing fulfilled and unfulfilled counts described above is a means of compressing the information that is present when fulfilled counts are used and unfulfilled counts are not used and which is necessary to permit the subtraction of a portion of the path behind a prevailing assertion (when this prevailing assertion disagrees with the counter-assertion) without also subtracting sub-paths that are common to the paths of other prevailing assertions that produce the resultant counter-assertion.

When unfulfilled counts are not used, the maximum number of bits required in order to represent each fulfilled count is equal to the number of variables in the expression. When unfulfilled counts are used in the manner described above, the number of bits required in order to represent each fulfilled count is one, and the number of bits required in order to represent each unfulfilled count is the base-2 logarithm of the number of constraints in the expression, which is usually a significant reduction in the number of switches required to represent the counts and the costs to operate those switches.

Maintaining the Order of Subtractions from the Basis

It is possible to use prevalence numbers instead of maximum distance counts to order the subtraction of prevailing assertions from the basis, but this requires that prevalence numbers consistently act as farness counts and therefore provide an ordering of assertions that prevents the removal of prevailing assertions that appear in sub-paths that are shared between the prevailing paths of other prevailing assertions that must have their full reasons subtracted from the basis and assertions that need not have their full reasons subtracted from the basis. The initial ordering of prevalence numbers is sufficient for them to perform as farness counts when accessed in descending order rather than ascending order, but prevalence numbers are reassigned when terms are counter-asserted, which disturbs the original ordering. Consequently, using prevalence numbers as farness counts usually requires significant revision of the prevalence numbers, which makes the amount of computational work required similar to that which is required when maximum distance counts are used as the farness counts.

Branch-Subtraction

It is noteworthy that neither the compressed nor the uncompressed version of full reason, whether the expression uses two-valued logic or many-valued logic, is equivalent to either a list of the restricted terms in a path or a list of the restricting values in a path, each associated with a count of the number of terms restricted by that value. Such counts or implicit counts do not support "branch-subtraction" in a rhizomatic network. The truth of this statement should become apparent by comparing the behavior of the different kinds of counts as they would be manipulated by the method of branch-subtraction which is described below.

In branch-subtraction, when a minuend full reason does not contain the value predicate of a subtrahend assertion, then the branch-subtraction difference is identical to the minuend. Otherwise, the branch-subtraction difference is the result of the following computations:

[B1] If unfulfilled counts are being used:
[B1a] For each value predicate in the minuend, subtract from each of the corresponding minuend counts the fulfilled count and unfulfilled count associated with the identical value predicate that is in the full reason of the subtrahend assertion.
[B1b] Subtract one from the associated fulfilled count and add one to the associated unfulfilled count where the value predicate of the subtrahend assertion is in the minuend.
[B2] Otherwise:
[B2a] Identify the fulfilled count in the minuend that is associated with the value predicate of the subtrahend assertion and call this the "scalar" value.
[B2b] For each value predicate in the minuend, subtract from the associated minuend fulfilled count the product of the scalar and the fulfilled count associated with the identical value predicate that is in the full reason of the subtrahend assertion.
[B3] After the subtractions above, remove any value predicates from the minuend that have zero in all existing counts, and present the result as the difference of the branch-subtraction.

Embodiments of the present invention may include the ability to distinguish whether a portion of a path contains a destination in order to exhibit Behavior #2. The ability to distinguish destinations and therefore count the distinct destinations in a portion of a path can also be very useful. Branch-subtraction can supply both these abilities.

Branch-subtraction without the use of unfulfilled counts requires multiplication for every subtracted value predicate in each full reason where branch-subtraction occurs. Multiplication has a computational cost that is the square of the number of bits being multiplied, and this represents another significant computational cost that is incurred when unfulfilled counts are not used.

Full Reasons in the Presence of Counter-Assertions

The existence of counter-assertions complicates the accrual of reasons for some assertions because negation of assertions removes the reasons for those assertions, and a counter-assertion may create a new reason for an assertion that was previously negated. The reasons of prevailing assertions that are being used to make decisions about the direction of motion of the point of contradiction must be consistent in order for the decision to be made correctly or consistently. Therefore, before such a decision can be made, the reasons of assertions that depend on assertions that were negated in order to make those reasons consistent may be re-computed. When nearness counts (see farther below as part of Exhibiting Behavior #4) are not used, reasons that depend on assertions that were negated may be re-computed by performing branch-subtraction for negated prevailing assertions and by performing branch-addition of the new reasons, when formerly negated assertions are counter-asserted. When performing branch-addition for this purpose, the farness counts of the re-asserted value predicate may be added to the farness counts in the added branch. Furthermore, any formerly conditional prevailing assertions that have recently become unconditional may be branch-subtracted, and the unconditional assertion itself may be removed from all full reasons.

Back-Tracking

When distance counts are being used, it may be necessary to "back-track" through the constraints in the path of an assertion that needs its reason re-computed rather than using branch-subtraction to revise the reason. This manner of back-tracking is similar to the one described below, but the reasons of assertions that restrict terms and have already been re-computed are branch-added and their counts are incremented, but these assertions are not explored by the depth-first mechanism.

It is possible to re-compute distance counts without back-tracking, but this requires separate distance counts for each contributing sub-path or else a count of instances of each distance count value, which would consume significantly more space than an uncompressed full reason consumes.

It is possible to exhibit Behavior #2 without using full reasons by using depth-first stack-based back-tracking through the restricted terms in the constraints that constitute the prevailing path that leads to and produces the counter-assertion. Depth-first back-tracking ensures that the attributes of prevailing assertions are revised in an order that is equivalent to descending farness order. This method ignores all terms that are restricted only by unconditional assertions, and ignores all terms that are restricted by assertions that have already been considered, and notes those terms that are destinations, including terms that are negated by loop assertions, and excluding illegitimate pseudo-assumptions (see farther below); and for each other term, stacks for consideration the conditionally restricted terms in the constraints of prevailing assertions that restrict the given term in a way that ensures depth-first traversal.

Back-tracking need not use permanently stored reasons. In such a case, there is no opportunity to revise reasons rigorously or otherwise. If permanently stored reasons are not being used, then temporary lists of destinations and possibly their distances must be maintained for each constraint the terms of which are stacked, and these temporary lists of destinations should be summed into the temporary destination lists for the constraints of dependent assertions as the terms restricted by the assertions are popped from the stack, and illegitimate pseudo-assumptions should be identified and eliminated at the time that disagreeing terms are popped from the stack. Temporary lists of destinations should be deleted after each contradiction is resolved. If destination lists are not deleted, then to be useful they will have to be revised, and in order for it to be possible to revise them without completely replacing them, they must contain non-destination terms or assertions, making them become reasons of some kind. It is possible to stack restricting assertions rather than terms for the purpose of back-tracking.

Because assertions get negated by counter-assertions, it is necessary to record the restrictions for terms in SOMMEs when full reasons are not being used, because the restricting determinants and assertions may no longer exist. Restrictions need not be recorded for terms in strictly disjunct phrases, because a missing restriction can be presumed to be the complement of the value predicate that the term represents in such a constraint, and indeed it may be more efficient to always record restrictions in this way for disjunct phrases.

Rigorous Maintenance of Prevailing Paths

When full reasons are being used and the path of a prevailing assertion is to be used for decision-making, it is necessary to re-compute the full reason of the candidate prevailing assertion. In order to maintain full reasons "rigorously", it is necessary to re-compute the full reasons of every prevailing assertion that depends on a negated prevailing assertion at the times of negation and counter-assertion.

At the time that full reasons are used for decision-making, the existence of pseudo-assumptions in the prevailing path must be recognized, if any. If unfulfilled counts are not being used, then branch-subtraction, as described, would incorrectly eliminate any record of pseudo-assumptions; so in this case, either an alternate method that marks pseudo-assumptions in some other way or back-tracking may be used. If unfulfilled counts are used and the full reasons of the negated prevailing assertions are not branch-subtracted from every full reason, then a decision-making method that uses dithering of the motion of a contradiction may be used to revise the full reasons and other path tracking elements to a state that is a useful approximation of a rigorous current state, as is described farther below.

Similarly, the value predicates asserted by constraints in a prevailing path must be consistent at the time a decision about the value predicate of a new counter-assertion is made. For disjunct phrases, no special action is necessary because such constraints either assert a pre-defined value predicate for a specific variable or do not make an assertion of that variable at all. However, in the case of SOMMEs, a change in a restricting value predicate may result in a change in the value predicate asserted or counter-asserted that has a prevailing path that includes the revised restriction, and these revisions need to be propagated through the prevailing path of any new counter-assertion. If conventional mathematical analysis does not supplement the present invention, then Behavior #3 may be violated if the assertions of SOMMEs are maintained rigorously, i.e. at the time of negation; so the revision of value predicates of SOMMEs when there is no conventional mathematical analysis is best propagated lazily, as described immediately below, or not propagated except by dithering, which is explained farther below as part of the discussion of exhibiting Behavior #4.

Lazy Maintenance of Full Reasons

When full reasons are not maintained rigorously, the full reasons may contain value predicates that have a zero fulfilled count, even while there is a prevailing assertion of that predicate. If any such value predicates exist in a full reason, the candidate full reason should be revised by branch-adding the missing reasons so that they then have a non-zero fulfilled count. If nearness counts (see farther below) or farness counts are to be used, then they must be correct at the time they are used (in the basis and co-basis, for example), and those counts should be re-computed when prevailing assertions exist but are not recorded in the full reason of a counter-assertion.

Re-computation of counts is most efficiently accomplished by depth-first back-tracking through the affected constraints, and then re-computing the farness counts or nearness counts (see farther below as part of Exhibiting Behavior #4) for the assertions of each of the affected constraints in reverse back-track order. When back-tracking is used only for re-computation of counts, it may occur on an as-needed basis. However, if full reasons are not being used to provide Behavior #2, then it is most efficient to perform a complete back-track and identify assumptions and pseudo-assumptions at the same time as farness or nearness counts are re-computed.

Pseudo-Assumptions, Loops, and Teardrops

When the full reason of a candidate prevailing assertion contains a value predicate for the same variable that is represented by the candidate prevailing assertion itself, there are a number of possible cases: the assertion may disagree with a value predicate in its full reason; the assertion may represent a value predicate that is a subset of a value predicate in its full reason (i.e. the counter-assertion "agrees" with a value predicate in its full reason); or some other relationship applies. These relationships define "loop" and "teardrop" paths and affect the definition of a legitimate destination.

Pseudo-Assumptions

When a counter-assertion occurs, assertions are negated, and consequently, the prevailing assertions that provide restrictions to terms in the paths of other prevailing assertions may go missing. When a rigorously maintained full reason contains a value predicate for which there is no extant prevailing assertion, we call that value predicate a "pseudo-assumption". Assumptions and pseudo-assumptions are destinations toward one of which a contradiction should move. Destinations are terms in constraints of the prevailing path of an assertion such that if a contradiction is moved to that constraint and the destination term is counter-asserted, the contradiction is expelled from the constraints of the recorded prevailing path.

No Destinations Rule

In order for embodiments of the present invention to exhibit Behavior #2 correctly, it is desired that any assertion that has a full reason and has no destinations in its full reason should be unconditionally asserted. This is the "No Destinations" rule. When a full reason of an assertion contains a value predicate for the same variable as the assertion itself, distinctions are provided by the present invention in order to implement the No Destinations rule to correctly produce unconditional assertions, as follows.

Loops

If an assertion agrees with a value predicate in its full reason, then we say that a "loop" exists in the prevailing path of this assertion. The structure of a loop is such that if an assertion in the looped prevailing path is negated, the contradiction that is produced may go around the loop to assert a value predicate that agrees with the negating counter-assertion, causing the contradiction in the loop to be resolved, effectively expelling the contradiction from the prevailing path of the loop without necessarily creating a new contradiction in some other path. Consequently, the start of a loop is a destination. If the assertion that completes a loop were to be prevailing, then it might be considered to support the restriction that starts the loop, which would provide a full reason for the assertion that completes the loop, and that full reason could contain no destinations, suggesting that it be interpreted as an unconditional assertion. That interpretation would be incorrect; so some additional rule or indication is necessary in order to ensure that loop assertions are not interpreted as unconditional assertions.

In certain embodiments of the present invention, an assertion that completes a loop is made to be non-prevailing, regardless of whether prevailing assertions for the same variable are extant or non-extant, but does contribute its value predicate to the determinant for the variable it represents, if the existing determinant does not represent a subset of the atomic values represented by the loop assertion. As a consequence of this, a loop cannot provide destination-free reasons for its own assertions and therefore a prevailing path that depends on a loop always apparently represents a destination in that path. (This rule prevents a loop assertion from having a reason, and therefore may be seen as a method of explicitly avoiding circulus in probando and thus avoids any appearance of a valid disagreement with the complement of the loop assertion.) In other embodiments of the present invention, loop assertions may be explicitly marked in other ways and treated as destinations by those other methods of marking.

Teardrops

If every value predicate in the full reason of a counter-assertion that represents the same variable as the assertion itself also disagrees with the value predicate represented by the assertion, then we say that a "teardrop" exists and is identified in the prevailing path of the counter-assertion. The "precipitant" of a teardrop is a value predicate that is known to represent a set of atomic values such that, if any such atomic value were asserted and the set of constraints that are in the prevailing paths of which the teardrop consists do not already contain a contradiction, the assertion would necessarily produce a contradiction in one of these teardrop constraints, regardless of the order in which assertions are propagated. The precision of a precipitant depends upon the information that is available in the prevailing path of the counter-assertion.

Precipitants

When all the constraints of which a teardrop consists that also have terms of the same variable as the precipitant of that teardrop are disjunct phrases, then the precipitant must disagree with each of these terms and is therefore the complement of the union of the value predicates represented by these terms. A counter-assertion that allows us to identify a teardrop must represent a subset of the atomic values that are in the complement of the precipitant of its teardrop.

When the set of constraints of which a teardrop consists and that also have terms of the same variable as the precipitant of that teardrop includes SOMMEs, then the precipitant must be the complement of the counter-asserted value predicate intersected with the restrictions on these terms.

If a putative precipitant is computed as above and the complement of the putative precipitant is an empty set of atomic values, then the putative teardrop is not in fact a teardrop and some legitimate destinations for the variable of the so-called precipitant must exist.

Counter-Asserted Value Predicates

If full reasons are being used, the branches for prevailing assertions that are negated by a counter-assertion are subtracted from the full reason of the counter-assertion. After these branch subtractions, if there are no destinations in the prevailing path of the counter-assertion for variables other than the variable of the precipitant, then the complement of the precipitant should be asserted unconditionally. If the value predicate of this unconditional assertion is the same set as the value predicate of the counter-assertion as produced by the rules of Implication, then the unconditional assertion is the only value predicate that is counter-asserted; otherwise, both the unconditional and conditional assertions are produced by the counter-assertion. If no teardrop is identified and the counter-assertion is not trivially unconditional, then the counter-assertion produces only a conditional assertion.

Apparent Pseudo-Assumptions in Teardrops

When a precipitant is being negated by the counter-assertion that defines it, the assertions that support the restriction that is the precipitant will be negated by the counter-assertion and the reasons for those branches will be subtracted from the full reason of the counter-assertion, thus making the terms that are restricted by these assertions be pseudo-assumptions and appear to be destinations. If the full reason of a counter-assertion that negates a precipitant contains no other destinations, then the counter-assertion should be unconditional because unconditionally asserting the precipitant would create an unconditional contradiction in the teardrop. Consequently, the restrictions recorded in the full reason of a counter-assertion that represent the same variable as the counter-assertion itself and which disagree with the counter-assertion should not be treated as destinations despite being pseudo-assumptions and are "illegitimate" destinations.

If a counter-assertion negates the precipitant of the teardrop that the counter-assertion identifies, and there are no legitimate destinations in the full reason of the counter-assertion, then the counter-assertion is unconditional; and unconditional assertions do not have reasons. If a counter-assertion negates its precipitant, and there are legitimate destinations in the full reason of the counter-assertion, then the counter-assertion is conditional; and although restrictions for terms of the same variable will appear in the full reason as pseudo-assumptions, other destinations will also be present in the prevailing path. If a contradiction moves toward any of these destinations, including the illegitimate destinations, a value predicate that includes some atomic values that are in the precipitant must be asserted, and this assertion is effectively a partial re-assertion of that precipitant. If the determinant produced by incorporating this value predicate that partially re-asserts that precipitant also fully supports any of the restrictions on terms of the same variable as our predicate-negating counter-assertion that were represented by the restricting value predicates in the full reason of the precipitant-negating counter-assertion, then the assertions that support those restrictions will provide their reasons to the full reasons of assertions that are led to and produced by these restrictions, and these restrictions will no longer appear to be pseudo-assumptions. If the determinant produced by incorporating this value predicate that partially re-asserts that precipitant does NOT fully support a restriction on a term of the same variable as our predicate-negating counter-assertion that is represented by a restricting value predicate in the full reason of the precipitant-negating counter-assertion, then the lack of extant prevailing assertions to support the restrictions on those terms will make those restrictions become legitimate destinations for the contradiction produced by the counter-assertion that produces the partial re-assertion of the precipitant. So a special rule that eliminates some pseudo-assumptions as being illegitimate destinations is only required when producing, and in order to correctly produce, a non-trivially unconditional counter-assertion, unless a Nearest Destination method is being used. (Nearest Destination methods are explained farther below as part of Exhibiting Behavior #4, and the complication for teardrop pseudo-assumptions when a Nearest Destination method is being used appears in the discussion of Dithering farther below.)

It is noteworthy that a first assertion that is in the prevailing path of a second prevailing assertion is always nearer to the second prevailing assertion than any illegitimate destination that the first assertion may have created.

Characterization of the Motion of Contradictions

A contradiction can be characterized as a disagreement of assertions between multiple rhizomatic networks that may have common network segments. By counter-asserting one of the disagreeing assertions, its network grows; and when the disagreeing assertions are negated, their networks shrink. Whether counter-assertion incorporates branch-subtraction of full reasons of the negated prevailing assertions or back-tracks through the new networks, the incorporated operation ensures that destinations that are strictly ahead of the counter-assertion are not represented as being in the network of the counter-assertion and therefore do not misinform the methods of embodiments of the present invention that exhibit Behavior #2 and Behavior #4.

Efficiency of the Methods of Behavior #2

The efficiency of the methods that exhibit Behavior #2 may be affected by two factors that have not yet been fully discussed: parallelization of the process of resolving contradictions, and prevalence of assertions.

The nature of teardrops is such that horizontal parallelization of the process of resolving constraints in the form of multiple processes simultaneously attempting to resolve contradictions can interfere with Behavior #2 to a degree that is moderate to severe. A first contradiction moving in parallel with a second contradiction could produce a counter-assertion resulting from the first contradiction that causes a term in the full reason of a counter-assertion resulting from the second contradiction to become a pseudo-assumption, when otherwise the prevailing path of the restriction on that term would permit the counter-assertion resulting from the second contradiction to be unconditional. Various efforts might be made to counteract this interference.

One method of counteracting interference between parallel contradiction resolution processes is to have each process record a separate set of full reasons that can persist when one counter-assertion erases the history of another counter-assertion, but which erases existing full reasons and cross-populates a replacement full reason into the separate stores of parallel contradiction resolution processes whenever a new full reason is generated by any of these processes. Obviously, this method requires a large increase in the amount of data stored.

Another method of counteracting interference between parallel contradiction resolution processes is to rank the contradictions so that no counter-assertion resulting from a first contradiction will be permitted if it would erase the history of paths being used by a second contradiction of higher rank, thus effectively suspending the motion of the first contradiction. This method can be improved by altering the ranks of contradictions so that suspended contradictions have their ranks lowered; otherwise a cascade of suspensions could occur, effectively reverting the algorithm to a non-parallelized condition. Great care would be necessary in order to formulate a re-ranking that was guaranteed to prevent hyper-polynomial dithering. (See farther below for a discussion of dithering.)

Prevalence of assertions affects the efficiency of the methods that exhibit Behavior #2 positively. By having prevailing paths that are distinct from additional paths that also converge conjunctively to produce a determinant that represents the same value predicate, the present invention avoids a hyper-polynomial explosion of possible paths that would need to be checked to discover whether any of those paths defined a teardrop and permitted an unconditional counter-assertion. Instead, paths are searched incrementally as long as extant contradictions that are dependent on those paths remain unresolved, in which case the unresolved contradictions provide new prevailing assertions with new paths that re-restrict terms that were formerly pseudo-assumptions. This is a form of path search that will terminate in polynomial time if Behavior #4 is exhibited.

Exhibiting Behavior #3

For counter-assertions that have prevailing paths that do not contain SOMMEs, enabling an algorithm to exhibit Behavior #3 is trivial if the algorithm has already been enabled to exhibit Behavior #2: immediately after the time of counter-assertion, the only constraints that contain new contradictions are those that had assertions which were negated by the counter-assertion, and the prevailing paths of negated assertions are subtracted from the prevailing path of the counter-assertion or ignored during a back-track of the prevailing path of the counter-assertion; so those contradictions do not appear in the prevailing path of the counter-assertion.

For counter-assertions that have prevailing paths that include SOMMEs, exhibiting Behavior #3 is more complicated. Generally, when SOMMEs exist in an expression, and the variable of the term for which a value predicate putatively should be counter-asserted is the same as the variable of one or more terms in the prevailing path of the putative counter-assertion, then special methods must be employed to efficiently exhibit Behavior #3.

When the values of variables represent integers or other rational numbers with a fixed maximum numerator and maximum denominator, then SOMMEs that are closed for the rational numbers may be replaced with a number of intermediate variables and disjunct phrases that represent the numbers digitally and reproduce the behavior of the SOMMEs for rational numbers. The order of magnitude of the count of intermediate variables or constraints in such a case depends on the specific function being reproduced. Adders have a linear count of elements; multiplication has a squared count of elements relative to the number of bits in the multiplication; and so forth.

Similarly, when the values of variables represent integers or other rational numbers with a fixed maximum numerator and maximum denominator, and it is acceptable that SOMMEs that are not closed for the rational numbers are allowed to produce estimated results, then too each of these SOMMEs may be replaced by a collection of intermediate variables and disjunct phrases.

Replacing a SOMME with intermediate variables and disjunct phrases permits the behavior of the SOMME to be produced directly as a product of the present invention, and Behavior #3 will be provided as for two-value logic. When SOMMEs are not replaced, it becomes possible that the introduction of a single-value determinant should force two or more other assertions from a set of unreplaced SOMMEs without one depending on the other and without any other intermediate assertions. If the behavior of the present invention is used to analyze such a structure, a hyper-polynomial number of revisions of variable values may occur; so it is necessary to supplement the present invention with conventional mathematical analysis in order to efficiently produce an acceptable result for such a structure. Such a supplementation may require that multiple value predicates are simultaneously revised and therefore asserted, and the nature of the relationship between SOMMES may require that some value predicates are unconditionally asserted even though assumptions exist in the prevailing path; but as long as the prevailing path is still recorded or is still reconstructable, then the present invention can successfully use conventional mathematical analysis as a black box function.

Exhibiting Behavior #4

Behavior #4 may be exhibited by having some means by which a specific prevailing path on which the contradiction will travel can be chosen and that choice is, by the nature of the means with which it is chosen, not subject to a hyper-polynomial number of revisions.

When only one term in a contradicted constraint is restricted by a conditional assertion, the contradicted constraint must be made to unconditionally counter-assert a value predicate of the variable of that one term. When two or more terms in a contradicted constraint are restricted by conditional assertions, the contradicted constraint must be made to counter-assert a value predicate of the variable of one of these terms, and this counter-assertion is conditional unless it is clear that there are no legitimate destinations in the prevailing path leading to this counter-assertion, as was discussed above.

In an embodiment of the present invention where only one processor operates on the expression, there is no reason to distinguish between formal assumptions and pseudo-assumptions that are legitimate destinations when making a choice of term for which a value predicate should be counter-asserted. However, when there are multiple processors, in other words, when the processing has been parallelized, it is preferable to move the contradiction in the direction of formal assumptions and suspend processing for contradictions that have only pseudo-assumptions in their full reasons and those pseudo-assumptions are not created by unconditional counter-assertions or in uncontroversial variables. Otherwise, it is possible for one contradiction to move toward a pseudo-assumption only to have the direction of motion reversed when the parallel motion of another contradiction that had created the pseudo-assumption is not successfully expelled and then re-asserts the value predicate that had been negated in order to form the pseudo-assumption, in which case, the motion of the given contradiction was wasted computational work.

Problems that are similar to those created by parallelized processing may become apparent if contradictions are not moved through the rhizomatic network in sequence. Consequently, it is desirable to maintain a stack or other ordered pool of contradictions to be resolved so as to ensure that the contradictions are resolved in a sequence that limits interference. A convenient sequence is to resolve a contradiction in a candidate constraint where the most recent counter-assertion negated the assertion of that candidate constraint immediately after resolving the contradiction in the counter-asserting constraint and to continue resolving contradictions according to their proximity to the most recent of the increasingly historic counter-assertions that created contradictions that have not yet been resolved.

Nearest Destination

One of the simplest ways to enable an algorithm to exhibit Behavior #4 when Behaviors #1 and #3 have already been enabled to be exhibited is by using a "Nearest Destination" method. Nearest Destination methods identify a destination that is "nearest" to the contradiction.

Nearness Counts

In certain embodiments of the present invention, a nearest destination is identified by comparing "minimum distance counts". Minimum distance counts are very similar to maximum distance counts except that they represent the least count among the minimum distance counts associated with the identical value predicates being unioned rather than the greatest count among maximum distance counts.

In other embodiments of the present invention, a nearest destination is identified by comparing "restriction counts". The advantage of restriction counts over minimum distance counts is that they provide a more extensive estimate of the computational work incurred by moving the contradiction to its destination. Restriction counts in the full reason for a resultant conditional prevailing assertion are constructed as follows:

When the full reason of the resultant assertion is being accrued, all the restriction counts that derive from the full reasons of previous assertions are identified, and unioned assertions not in these full reasons are given a restriction count that is equal to the number of constraints that would be restricted by a counter-assertion of a value predicate for the term in the constraint of the resultant assertion that is restricted by that assertion, and then the single minimum restriction count among all the restriction counts for the same value predicate in the union that produces the set of value predicates in the full reason of the resultant is identified and the number of constraints that would be restricted by a negation of the resultant assertion is added to each of the identified counts before each is assigned as the restriction count for the corresponding value predicate in the full reason of the resultant assertion.

In other embodiments of the present invention, a nearest destination is identified by comparing "work counts". The advantage of work counts over restriction counts is that they provide a better estimate of the computational work that may be incurred by moving the contradiction to its destination. Work counts in the full reason for a non-assumptive resultant conditional prevailing assertion are constructed as follows:

When the full reason of the resultant assertion is being accrued, all the work counts that derive from the full reasons of previous assertions are identified, and unioned assertions not in these full reasons are given a work count that is equal to the number of constraints that could become contradicted or asserting as a result of a counter-assertion of a value predicate for the term that is restricted by that assertion, and then the single minimum work count among all the restriction counts for the same value predicate in the union that produces the set of value predicates in the full reason of the resultant is identified and the number of constraints that would become contradicted or asserting as a result of a negation of the resultant assertion is added to each of the identified counts before each is assigned as the work count for the corresponding value predicate in the full reason of the resultant assertion.

Because the number of constraints that would become contradicted or asserting may be affected by parallel constraint resolution processes, work counts may have to be re-computed in order to avoid dithering in that case. This extra computational cost would probably eliminate much of the advantage that work counts might otherwise provide. Also, when an expression uses many-valued logic, it may not be possible to accurately determine the number of constraints that would become contradicted or asserting as a result of a counter-assertion, because the value of the counter-assertion may not be entirely predictable.

"Nearness counts" is the name that generalizes the set of counts that are exemplified above as minimum distance counts, restriction counts, or work counts. Other kinds of nearness counts are possible, but any valid nearness count should support a Nearest Destination method by providing an ordering of directions in which to move a contradiction that persists or becomes more emphatic after the contradiction has moved if the counts are maintained rigorously, as do the example nearness counts described above.

Counter-asserting a value predicate for the restricted term that provides the least nearness count for a valid destination and negating the prevailing assertions that restrict the term of the counter-assertion when nearness counts are rigorously maintained will cause the nearness count associated with the chosen destination in the full reason of the prevailing assertion that is being negated by the counter-assertion to become less for the next counter-assertion than it was before, as the contradiction moves from constraint to constraint; and the nearness counts for all other paths to the chosen destination will often increase but can decrease by an increment that is identical to the decrease in the nearness count of the currently chosen path to the destination at most, which leaves the nearness ordering of the various paths to the chosen destination intact or even more emphatically preferring the selected path. So in such cases, the contradiction will move toward the chosen destination without ever retracing a path.

Dithering

If nearness counts are not rigorously maintained, then the motion of the contradiction may dither when a Nearest Destination method is being used. When a contradiction moves toward a chosen destination and then it is revealed that the chosen destination is no longer in the path in that direction or it is actually farther to the chosen destination along this path than it appeared, and a different path to the same destination is nearer relative to the revealed distance along the current path, or a different value predicate is chosen as the destination, then the direction of motion of the contradiction changes. This change of direction could be opposite to the direction recently traversed, resulting in "dithering", meaning that the contradiction would re-traverse some of the same constraints, possibly returning to its original position before moving toward the newly preferred destination. However, in this case, the nearness counts for the original destination and other destinations in the same path will be updated as the contradiction moves away from the point where it was revealed that the preferred destination is not most expeditiously reached along the original path. This means that if the direction of motion of the contradiction is again reversed, there will be no revelation at or prior to the point where a revelation of a change in the nearest destination was found the first time that the direction of motion was reversed. Consequently, the contradiction will eventually reach one of the destinations, possibly retracing a central chain of constraints back-and-forth a number of times that is limited by the number of constraints in the expression that could record revelations about the nearest destination. So pursuing a chosen destination along the path that provides the least nearness count when nearness counts are not rigorously maintained still produces behavior that does not have a hyper-polynomial cost, even though the method is significantly less efficient than a similar method where the nearness counts are maintained rigorously.

It is possible for infinite dithering to occur when a Nearest Destination method is being used, because illegitimate destinations in a teardrop may be nearer to the contradiction than any legitimate destinations. If illegitimate destinations are nearer to the contradiction in more than one direction, then the contradiction will move toward one illegitimate destination until the precipitant of its teardrop is re-asserted, at which point it will disappear as a potential destination and a different illegitimate destination in the reverse direction may be the nearest apparent destination. In that case, re-negating the precipitant will make the original illegitimate destination appear to be nearest again, causing the direction of motion to reverse again ad infinitum.

In order to prevent infinite dithering from happening when a Nearest Destination method is being used, any of the following strategies may be used: (1) explicitly indicating pseudo-assumptions that are illegitimate destinations, populating this indication at the time of making the counter-assertion that negates the precipitant for best efficiency, and allowing this indication to be recessively inherited by assertions that are led to and produced by the counter-assertion that identifies the teardrop in context, or (2) regularly comparing the value predicates for the same variable that are in the full reasons to re-identify when apparent pseudo-assumptions are not legitimate destinations, or (3) making a similar re-identification while back-tracking, or (4) modifying the method by adding a rule that the contradiction should not reverse direction unless all other possible directions of motion are restricted and those restrictions are fully supported by unconditional assertions, producing a method called Nearest Destination Ahead.

An explicit indication of an illegitimate destination is effectively a declaration that the pseudo-assumption will have a valid reason at any time when it is possible to counter-assert the term restricted by that value predicate within the currently recorded prevailing path and therefore it should not be treated as not having a valid reason even though a valid reason is not currently recorded. As mentioned, the heritability of an explicit indication of an illegitimate destination should be recessive, meaning that if a first prevailing path has such an indication and a second prevailing path that is disjunctively converging or conjunctively converging with the first prevailing path does not have such an indication then the result should have no such indication. The nearness count for an illegitimate destination should similarly be propagated recessively. Because the same term may appear to be an illegitimate destination in one sub-path and simultaneously appear to be a legitimate destination in another sub-path, when using back-tracking to identify destinations it is necessary to keep a record of all values encountered during the search, which is best embodied by a history of elements that have been popped from the stack.

The possibility of dithering is the main reason that it is best for prevailing assertions to persist, especially so when full reasons are not being used and it is necessary to back-track in order to obtain the information that Behavior #2 relies upon.

A method that moves a contradiction toward the nearest destination regardless of whether it is ahead or behind the most recent counter-assertion is called the Strictly Nearest Destination method. A method that moves a contradiction in the direction in which a preferred destination appears nearest is called the Nearest Preferred Destination method, and there is also a Nearest Preferred Destination Ahead method. Each of the methods listed are members of the class of Nearest Destination methods.

Farthest Reversal

Another class of methods that enables Behavior #4 to be exhibited when Behaviors #1 and #3 have already been enabled to be exhibited is called the "Farthest Reversal" method. Farthest Reversal relies upon differentiating the paths that lead to the prevailing conditional assertions that restrict terms in the contradicted constraint.

The construction of the compressed full reason effectively employs cascading branch-subtractions. This same method of cascading branch-subtractions can be used to differentiate full reasons. Specifically, the final co-basis before it is added to the basis is a "differentiated reason" relative to the basis.

In a Farthest Reversal method, it is necessary to identify the term in a constraint that was most recently conditionally restricted. This identification may be facilitated by recording the order in which all terms of a constraint are restricted.

Such an ordering may be recorded for each constraint individually, or prevalence numbers may be used for this purpose.

The Full Farthest Reversal method may include the following operations:

[F1] A destination is chosen for the motion of a given contradiction. The manner of choosing is not important as long as the choice is legitimate and persistent. If it is revealed that the chosen destination is not in the paths that lead to the given contradiction, then another destination is chosen; but otherwise, the choice should persist as the contradiction moves through the constraints.

[F2] If only one or two terms in the given contradicted constraint are restricted by a determinant that has the destination in the full reasons of the prevailing assertions that conjunctively converge into it:

[F2a] The term that is the least recently restricted term among such similarly qualified terms is the term for which a value predicate is to be counter-asserted.

[F3] Otherwise:

[F3a] Among terms in the given contradicted constraint that are restricted by a determinant that has the destination in the full reasons of the prevailing assertions that conjunctively converge into it, the term that was most recently restricted is designated as the "main" term and the prevailing path of the main term is the "main path".

[F3b] For each term in the given contradicted constraint that is restricted by a determinant that has the destination in the full reasons of the prevailing assertions that conjunctively converge into the determinant:

[F3b1] Initialize a "pruned co-basis" as empty for the given term.

[F3b2] For each prevailing assertion that conjunctively converges to produce the determinant that restricts the given term and that has the destination in its full reason:

[F3b2a] Copy the full reason of the given prevailing assertion as the "temporary co-basis".

[F3b2b] For each value predicate in the temporary co-basis that does not represent the destination or the value predicate of a prevailing assertion that has a full reason that contains the destination, in ascending order of farness counts:

[F3b2b1] Branch-subtract the prevailing assertion that represents the given value predicate from the temporary co-basis, and remove the given value predicate from the temporary co-basis.

[F3b2c] Branch-add the temporary co-basis to the pruned co-basis, and add the value predicate of the given prevailing assertion to the pruned co-basis for the given term.

[F3c] Copy the pruned co-basis for the main term as the "main basis", and eliminate the pruned co-basis for the main term.

[F3d] For each term in the given contradicted constraint that has a remaining pruned co-basis:

[F3d1] For each value predicate in the pruned co-basis of the given term, in ascending order of farness counts:

[F3d2a] If the given value predicate is in the main basis of the given term, then branch-subtract the prevailing assertion of the given value predicate from the pruned co-basis of the given term.

[F3e] The term in the given contradicted constraint that has a remaining pruned co-basis that contains a value predicate with the greatest farness count is the term to be counter-asserted.

In a Farthest Reversal method, as in Nearest Destination methods, if the counts are not maintained rigorously, the motion of contradictions may dither. In both methods, the number of dithers is limited by the number of constraints that may be contradicted or may provide an impetus for a change of direction of motion of an existing contradiction, and the maximum number of times a single constraint may be traversed by a contradiction in response to a dither is equal to the number of terms in that constraint, and a new set of dithers is possible whenever an assumption is introduced. Any method of choosing a direction in which to move a contradiction that limits the number of constraint traversals per dither to the number of terms in the constraint and limits the number of dithers per assumption to the number of constraints in the expression is an acceptable method.

A Farthest Reversal method works by consistently choosing a path that does not join the main path or joins the main path at the farthest possible point from the contradiction relative to distance as measured in the main path itself, and this prevents the motion of the contradiction from doubling-back on the main path and then redoubling-back except in cases where information about the path is lost or not previously available.

There are a number of varieties of Nearest Destination methods; and similarly, there are a number of varieties of Farthest Reversal methods. However, while Nearest Destination methods may vary according to how nearness is measured, applying different ways of measuring farness to Farthest Reversal methods produces orderings of assertions in a prevailing path that are similar to one another. A more substantial example of a variant of a Farthest Reversal method is one that uses stratified reasons.

Stratified Reasons

A "stratified reason" is a kind of record of a prevailing path that is limited to constraints that provide prevailing assertions that have a specific assumption in their prevailing paths. These constraints are stratified in the sense that every constraint that produces an assertion as a result of the introduction of a first assumption may be a part of the stratified reason of another constraint in that same set, and every constraint that produces an assertion as a result of the introduction of the first assumption in combination with a second assumption may be a part of the stratified reason of another constraint in this latter set, and thus the constraints are separated into "strata" with each stratum being assigned to a specific latest assumption that is called the "source" for the assertions in its stratum. A stratified reason is similar to a pruned co-basis as is described above, except that a pruned co-basis does not contain value predicates that represent restrictions from other strata and does not include paths that lead to pseudo-assumptions without also leading to the specified assumption through the same constraints, and except that stratified reasons do not have fulfilled counts, unfulfilled counts, or nearness counts but do contain prevalence numbers but the prevalence numbers are not revised to serve as rigorously maintained farness counts. As such, stratified reasons are part of the prior are where they are simply called "reasons".

Being similar to a pruned co-basis is the chief advantage of using stratified reasons as part of an embodiment that use a Farthest Reversal method, because it reduces the cost of producing an actual pruned co-basis. However, when a first rhizomatic network shrinks because portions of it are being consumed by a second rhizomatic network of a different stratum, the paths of the first rhizomatic network that lead to and produce restrictions in the prevailing path of the second rhizomatic network are not available; and consequently, the motion of contradictions in the second rhizomatic network will not recognize that counter-assertions should be unconditional without the occurrence of dithering down those other paths of the first rhizomatic network. In addition, prevalence numbers that are not rigorously maintained as farness counts will cause additional dithering, and rigorous maintenance is itself additional computational work. So altogether a variant of Farthest Reversal methods that uses stratified reasons will not be especially efficient.

Variants of Farthest Reversal methods may provide small reductions to the computational costs by finding a shorter path to the point of rejoining the main path or by preferring to choose a destination for which a short path to the point of rejoining the main path exists.

Because Nearest Destination methods require traveling minimum distances or traveling a path that is expected to incur minimal computational costs to expel a contradiction, and the Farthest Reversal method requires traveling to a point that is earliest in the main path, regardless of the distance traveled or computational cost of traversing that distance, Nearest Destination methods will tend to incur lesser computational costs in order to expel a contradiction, providing Nearest Destination methods with advantages over certain alternatives.

Adjusting the Methods that Enable an Algorithm to Exhibit Behavior #4

In some cases it is possible that a contradiction must be moved in a direction different from the direction that would be chosen according to Nearest Destination or Farthest Reversal. This may be the case when the complement of a counter-assertion would have been empty or a system of SOMMEs requires that only certain variables may have value predicates counter-asserted. When this is the case, it is necessary to adjust the method of choosing a direction, whether that method is Nearest Destination or Farthest Reversal. One way to provide this adjustment is to associate the desired term to be counter-asserted, identified by the value predicate found in the full reason that restricts that term, with the contradiction in motion, efficiently embodied as a data structure associated with the process of resolving contradictions, rather than being associated with a variable, constraint, term, or assertion. More than one such process notation may be necessary per process, but the number of such notations cannot exceed the number of variables in the expression.

Some descriptions above of methods that are used to choose a direction in which to move a contradiction are written as if a destination has been pre-chosen. In cases where there is no prescribed preference for negating certain assumptions rather than other assumptions, it is often useful to modify the methods for choosing a direction by subtracting the conditional prevailing assertions that restrict other terms in the contradicted constraint from the prevailing path of each term that is a candidate for counter-assertion. Doing this has the effect of limiting the decisive information for each candidate term to those factors that are not derived solely from paths that pass through the other candidate terms.

Other Embodiments of the Present Invention

When there are user preferences that certain variables obtain specific values and the algorithm is altered to respect those preferences, then the alteration embodies a "conservative" variant of the algorithm. When no alteration is implemented, a "dynamic" variant of the algorithm is embodied.

When multiple preferences have identical rank, it is possible to embody the difference as a preference for certain destinations when resolving a contradiction. However, when rigorous optimization is required, it is necessary to embody the present invention as a process that finds a satisfying value assignment for the variables, followed by another process that takes the resulting network, including reasons, and imposes, one-at-a-time in ranked order of preference, the preferred values as unconditional assertions, rejecting any such unconditional assertion if it produces a necessary contradiction.

Complex preference structures may be embodied as additional constraints, such as constraints that may be interpreted as representing the sum, product, or other result of an optimization scoring regimen. In this case, the preferences are imposed on the variables that represent this result.

Embodiments of the present invention may be implemented in various ways. The choice of implementation for a particular substrate may depend on the implementational economies available to that substrate. Specifically, the production of devices typically trades a linear increase in computational time in order to save a squared cost of space for mechanisms, and the production of software often makes the opposite trade preferring to save computational time at the expense of additional memory usage. One particular useful embodiment of the present invention, which provides a low maximum computational cost, embodies a single-threaded dynamic variant that performs a Nearest Destination method of choosing a direction in which to move contradictions and stores compressed full reasons that include unfulfilled counts and maximum distance counts and restriction counts. The majority of the full reasons are best maintained rigorously, but the maximum distance counts and restriction counts are best maintained lazily, and SOMME value predicate revisions are best maintained lazily unless the present invention is supplemented by a process that provides conventional mathematical analysis.

Generality

Embodiments of the present invention use relationships between the constraints themselves to define the proximal space through which contradictions move. Consequently, the motion of contradictions is not affected by the nature of the values, whether they are well-ordered, partially-ordered, or disjoint, and whether they are mutually-exclusive or fuzzy; nor is this motion affected by the quality of the value predicates, whether they are intervals, sets, or discrete values; nor is this motion affected by the quality or shape of the extension of the constraints, whether it is continuous, bifurcated, or discrete, and whether it is convex, contiguous but non-convex, or non-contiguous, or there is no feasible extension at all. Neither is the correctness of embodiments of the present invention nor the order of magnitude of the maximum computational expenditure adversely affected by the order in which assumptions are made or the order that determines which assertion among competing assertions becomes prevailing. However, the maximum computational expenditure of embodiments of the present invention is affected by the number of variables, the number of differentiated values of those variables, and the number of constraints; and because SOMMEs may operate on variables with an infinite number of values, the motion and maximum computational expenditure of embodiments of the present invention is affected by whether the constraints are disjunct phrases or other explicitly logical expressions or SOMMEs.

The number, direction, and conditionality of counter-assertions resulting from the resolution of a contradiction when the expression includes SOMMEs may be different than when the expression contains only disjunct phrases, as was mentioned above; but the definition of proximity of constraints and the proximal space that the constraints define and through which the contradictions move remains unaffected. Consequently, embodiments of the present invention provide a means of processing expressions that is much more versatile than methods that rely on linear expressions, Euclidean distance, conventional topological nearness, or a convex extension.

EXAMPLE EMBODIMENTS

Embodiment #1 (General Computation)

One embodiment of the present invention is a general improvement to computerized computation, providing a reduction in the costs of running the computational device while solving a problem in NP, NP-complete, or NP-hard, and a reduction in the amount of time that an operator of the computational device must wait for a result while solving a problem in NP, NP-complete, or NP-hard. This embodiment of the present invention is comparable to a new arithmetic circuit in a calculator or to a software module that emulates such a circuit.

Embodiment #2 (Template Making)

One embodiment of the present invention is a device or automated process that renders templates that are used by another machine to cut parts from material or otherwise used by a machine to guide some processing of material into components of a product, whether the process is producing lumber from timber, clothing panels from cloth, leather, or plastic, or car or other machine parts from metal sheets, bars, or wire, or some other manufactured part from a refined material.

The technical effect of this embodiment is that templates are provided that permit optimal utilization of materials without excessive computational costs, which reduces waste of both material and computational costs. This optimization typically uses variables and constraints that represent the geometric requirements of the parts to be rendered and may also include constraints that reflect the different economic values of parts that might be rendered from a particular piece of stock, as well as including constraints that summarize the utilization of materials and value of the product in order that a conservative variant of this embodiment of the present invention may force the production of a template that maximizes the utilization of stock or value produced. When the constraints reflect the different values of parts, then an additional technical effect is the maximization of the value of the product.

(See Javanshir, H. and Shadalooee, M. "The Trim Loss Concentration in One-Dimensional Cutting Stock Problem (1D-CSP) by Defining a Virtual Cost" *Journal of Industrial Engineering International* 2007;
Kenyon, Claire and Rémila, Eric "A Near-Optimal Solution to a Two-Dimensional Cutting Stock problem" Mathematics of Operational Research 2000.)

Embodiment #3 (Cutting Machine Control)

One embodiment of the present invention is a part of the control mechanism of a cutting machine, drilling machine, grinding machine, or other machine that renders parts from stock material, whether the process being supplied by the machine is cutting lumber from timber, furniture parts from lumber, panels from cloth, leather, or plastic, or car or other machine parts from metal sheets, bars, or wire, or some other manufactured part from a refined material.

The technical effect of this embodiment is the control of the drills or cutting surfaces that provide optimal utilization of materials without excessive computational costs, which reduces waste of material, computational costs, and total cutting time. This optimization typically uses variables and constraints that represent geometric requirements of the parts that are being rendered and may also include constraints that represent the different economic values of parts that might be rendered from a particular piece of stock, as well as including constraints that summarize the utilization of materials and value of the product in order that a conservative variant of this embodiment of the present invention may force a rendering of parts that maximizes the utilization of stock or value produced. When the constraints reflect the different values of parts, then an additional technical effect is the maximization of the value of the product.

(See Javanshir and Shadalooee op. cit.; Kenyon and Rémila op. cit.)

Embodiment #4 (Robotic Vehicle Control)

One embodiment of the present invention is a part of the control mechanism of a robotic vehicle, allowing the vehicle to choose expedient paths to its destinations.

The technical effect of this embodiment is a minimization of travel time or cost, while reducing wait-times and computational costs associated with making the decisions that drive the vehicle. This minimization typically uses variables and constraints that represent the geographic locations of destinations, the geographic paths between various positions, and physical or economic impediments associated with the various path segments, in addition to constraints that summarize the physical and economic impediments in order that a conservative variant of this embodiment of the present invention may force the choice of a path with a minimal travel time or cost.

(See Peng, Jufeng and Akella, Srinivas "Coordinating Multiple Robots with Kinodynamic Constraints along Specified Paths" *International Journal of Robotics Research* 2005.)

Embodiment #5 (Data Compression)

One embodiment of the present invention is a device or automated process that compresses data, whether the data represents text, an image, an audio message, a video recording, an executable binary, or some other encrypted or non-encrypted unit of information, whether the data is digital or can be represented as a Fourier decomposition or other algebraic decomposition of analog data.

The technical effect of this embodiment is an optimization of the compression effect on a unit of information relative to the costs of computations that produce the compression. This optimization typically uses variables and constraints that represent preferences about the elapsed time required to decompress the information and constraints that reflect computational costs and compressive benefits of various strategies for compression, in addition to constraints that represent a summarization of compression in order that a conservative variant of this embodiment of the present invention may force an optimally compressed result.

(See Ruhl, Matthias and Hartenstein, Hannes "Optimal Fractal Coding is NP-Hard" *Proceedings of the International Conference on Image Processing* 1997.)

Embodiment #6 (Protein Design)

One embodiment of the present invention is a device or automated process that provides a sequence of amino acids that conforms to a given geometric structure.

The technical effect of this embodiment is a reduction of the time and computational expense associated with the production of custom proteins or models of custom proteins and a reduction in the wait-time for designers. Such a device or automated process typically uses variables and constraints that represent the chemical limitations on amino acid positioning in a peptide, whether those limitations are based on hydrogen bonding, ionic interactions, Van der Waals forces, or hydrophobic packing, or other known or suspected chemical properties or environmental conditions, in addition to constraints that reflect the preferred three-dimensional shape of the protein in order that a dynamic variant of this embodiment of the present invention may produce a conforming sequence of amino acids.

(See Pierce, Niles A. and Winfree, Erik "Protein Design is NP-Hard" *Protein Engineering* 2002.)

Embodiment #7 (Telecom Traffic Routing)

One embodiment of the present invention is a device or automated process that optimizes the utility of a telecom network relative to cost by routing messages away from network congestion.

The technical effect of this embodiment is the optimization of the utility of the message routing capability of an existing telecom network while reducing wait-times and saving computational costs associated with providing that utility. This optimization typically uses variables and constraints that represent the topology of the telecom network, measurements of congestion on the network, the utilitarian values of messages to be transmitted, and various costs of using and transmission speeds across various segments of the network, in addition to using constraints that summarize the costs and utility in order that a conservative variant of this embodiment of the present invention may force an optimal routing for the message load.

(See Gibbens, R. J. et al. "Dynamic Alternative Routing—Modelling and Behaviour" *Proceedings of the 12$^{th}$ International Teletraffic Congress* 1988.)

Embodiment #8 (Wavelength Division Multicasting Traffic Grooming)

One embodiment of the present invention is a device or automated process that produces an ADM installation plan consisting of a list of wavelengths and a number of add-drop multiplexors (ADMs) per fiber that is optimal with respect to hardware cost or blocking probability.

The technical effect of this embodiment is the optimization of the WDM network to minimize the costs of constructing and maintaining the network or the probability of reaching a traffic-blocking condition, while saving computational costs associated with performing the optimization that results in the production of the list of wavelengths and number of ADMs. This optimization typically uses variables and constraints that represent the available bandwidth of the transmission channel, the costs of optics, ADMs, and other components of the network, and possibly expected traffic demands, in addition to constraints that summarize the costs or blocking probability so that a conservative variant of this embodiment of the present invention may force an ADM installation plan that minimizes costs or blocking probability.

(See Capone, Antonio et al. "Multi-layer Network Design with Multicast Traffic and Statistical Multiplexing" *Global Telecommunications Conference* 2007.)

Embodiment #9 (Satellite Placement)

One embodiment of the present invention is a device or automated process that produces a placement specification for a set of orbital satellites that satisfies service arc requirements while minimizing the likelihood of communications interference and collision.

The technical effect of this embodiment is an optimization of the placement of satellites that provides a minimized cost composed of a combination of risk of destruction and degradation of service caused by communication interference, while saving computational costs associated with performing the optimization. This optimization typically uses variables and constraints that represent orbital mechanics, the shell in which the set of satellites may be placed, the orbits of existing satellites and debris, the positions of base stations and other surface objects that define the value of the service arcs of each of the satellites, and the positioning costs for various locations in the shell, in addition to constraints that summarize the values and costs of the placement specification so that a conservative variant of this embodiment of the present invention may force the production of an optimal placement specification.

(See Spälti, Susan B. and Liebling, Thomas M. "Modeling the satellite placement problem as a network flow problem with one side constraint" *Operations Research Spektrum* 1991.)

Embodiment #10 (Component Design)

One embodiment of the present invention is a device or automated process that produces a component design that minimizes the cost of labor and materials required to manufacture components that meet required physical specifications, whether those components are structural trusses, submarine propellers, electrical batteries, or any other kind of component.

The technical effect of this embodiment is the minimization of manufacturing costs of physical components, while saving computational costs associated with producing such a minimization and while saving the wait-time of component designers. This minimization typically uses variables and constraints that represent the specifications of the physical requirements of the components, the available materials that may be used to construct the component and their stock specifications, the relationships that determine how the types of materials and their configuration affect the physical properties of the component, and the costs of altering stock material into parts and assembling them, in addition to constraints that summarize the costs in order that a conservative variant of this embodiment of the present invention may force a design that minimizes the manufacturing costs.

(See Pownuk, Andrzej "Optimization of mechanical structures using interval analysis" *Computer Assisted Mechanics and Engineering Sciences* 2000.)

Embodiment #11 (Cryptanalysis)

One embodiment of the present invention is a device or automated process that finds multiplicative factors or inverts hashes that have been used to encrypt data.

The technical effect of this embodiment is the decomposition of a cypher-text into a plain-text, while saving computational costs associated with producing this decomposition. Such a device or automated process typically uses variables and constraints that represent the cypher-text as well as representing known or suspected encryption algorithms that have been or may have been applied to the plain-text in order to produce the cypher-text in order that a dynamic variant of this embodiment of the present invention may produce clear-text.

(See Valée, Brigitte "Generation of Elements with Small Modular Squares and Provably Fast Integer Factoring Algorithms" *Mathematics of Computation* 1991.)

Embodiment #12 (CPU Job Scheduling)

One embodiment of the present invention is a device or automated process that produces a schedule of jobs to be processed by a computer's central processing unit (CPU) that maximizes the throughput or responsiveness of the CPU under a given workload or minimizes the energy usage.

The technical effect of this embodiment is the maximization of throughput or responsiveness of the CPU or minimization of the energy usage, while saving computational costs associated with producing the schedule, which in turn provides an additional improvement to the throughput or responsiveness of the CPU. Such a device or automated process typically uses variables and constraints that represent the jobs to be executed and their urgency, the sub-steps of the jobs and their order, the resources required for each sub-step, and the resources available to the CPU, in addition to constraints that summarize the energy used or measurements that reflect the responsiveness or throughput of the CPU when executing the schedule of jobs so that a conservative variant of this embodiment of the present invention may force a maximization of throughput or responsiveness or a minimizations of energy use.

(See Baruah, Sanjoy K. "Preemptively Scheduling Hard-Real-Time Sporadic Tasks on One Processor" *Real-Time Systems Symposium* 1990.)

Embodiment #13 (IC Test Bus Development)

One embodiment of the present invention is a device or automated process that produces a design for an on-chip test access architecture or test access mechanism (TAM) for a system-on-chip (SOC) or other complex integrated-circuit chip (IC) that includes a test bus, where this design includes an assignment of cores to test buses, the widths of the test buses and their subdivisions, and a schedule of tests.

The technical effect of this embodiment is an optimization of the test bus that provides a maximization of the testing utility value relative to the construction costs of the test bus, while saving computational costs associated with performing the optimization. This optimization typically uses variables and constraints that represent the cores and their input pins, the various tests required and their core pin access requirements, the times to complete the various tests, the value of reduced testing time, and the costs of increasing test bus widths, in addition to constraints that summarize the value of testing time required by the schedule of tests and the costs of constructing the buses in order that a conservative variant of this embodiment of the present invention may force an optimization of the testing utility value relative to the construction costs of the test bus.

(See Chakrabarty, Krishnendu "Optimal Test Access Architectures for System-on-a-Chip" *ACM Transactions on Design Automation of Electronic Systems* 2001.)

Embodiment #14 (IC Circuit Partitioning, Floorplanning, & Placement)

One embodiment of the present invention is a device or automated process that produces a circuit layout that separates a logically-defined complex behavior into multiple modules, circuit cores, cells, or blocks suitable for positioning as part of an IC, where the layout satisfies size limitations or limitations on the number or size of interconnects between the circuit cores, cells, or blocks that in turn may provide a circuit delay that is within desired limits.

The technical effect of this embodiment is a partitioning of the circuit that satisfies the size and circuit delay limitations, while saving computational costs associated with producing the circuit layout. Such a device or automated process typically uses variables and constraints that represent the logical behavior of the circuit, the possible translations of individual logical behaviors into sub-circuits, the sizes and circuit delays of the various sub-circuits, including limitations on juxtaposition of various sub-circuit components caused by the geometry of the chip and various electrical effects, the limitations on the partition sizes and circuit delays, and a summarization of the sizes and delays of the circuit layout in order that a dynamic variant of this embodiment of the present invention may produce a satisfying layout. The constraints used by such a device or automated process may also represent costs of construction and a formula that provides a trade-off between costs and performances in order that a conservative variant of this embodiment of the present invention may force a circuit layout that provides an optimization of the trade-off.

(See Kahng, Andrew B. et al. *VLSI Physical Design: from Graph Partitioning to Timing Closure* 2011.)

Embodiment #15 (IC Power, Ground, Clock, & Netlist Routing)

One embodiment of the present invention is a device or automated process that produces a wiring plan for an IC, whether that plan includes routing for power pins, ground pins, clock signal pins, or connecting input and output pins for the various cores, cells, or blocks of the IC, where the plan satisfies limitations on the length and width of interconnects between the cores, cells, or blocks so that the interconnects do not exceed the available space on the IC and circuit delay limitations for the IC are not violated.

The technical effect of this embodiment is the production of a wiring plan that satisfies size and circuit delay limitations, while saving computational costs associated with producing the wiring plan. Such a device or automated process typically uses variables and constraints that represent the various cores, cells, or blocks and their shapes and pins, the list of connections between the output pins of each core, cell, or block to the required input pins on other cores, cells, or blocks, the list of connections of chip input pins to core, cell, or block input pins, limitations on the sizes of interconnects that are due to the geometry of the chip size and fabrication processes, limitations on juxtaposition of interconnects that are due to electrical effects such as capacitive coupling or inductive cross-talk, and the possibility of implementing clock closure techniques such as extra-wide interconnects and cloning modules, in addition to constraints that summarize the space consumed by the cores, cells, or blocks and possibly the signal delay of clock circuits in order that a dynamic variant of the present invention may force a wiring plan that satisfies the space and signal delay requirements. The constraints typically used by such a device or automated process may also represent costs of construction and a formula that provides a trade-off between cost and performance in order that a conservative variant of this embodiment of the present invention may force a wiring plan that provides an optimal balance between cost and performance.

(See Kahng, Andrew B. et al. op. cit.)

Embodiment #16 (Advanced IC Fabrication)

One embodiment of the present invention is a device or automated process that produces masks for IC fabrication that satisfy size and performance requirements and a list of fabrication process that should be applied in combination with the masks in order to directly produce an IC that satisfies behavioral specifications.

The technical effect of this embodiment is a greatly streamlined IC design process that, while theoretically possible without the present invention, only becomes practical because of the computational cost savings provided by the present invention. Such a device or automated process typically uses variables and constraints that represent all the technical limitations of IC fabrication in general, the specific limitations of the proposed fabrication facility, geometrical limitations of the various wafer sizes on which the IC may be created, coding requirements for producing the masks themselves, whether the masks are for deposition, removal, patterning, or modification of electrical properties, the desired functional behavior of the IC, required tests for the IC behavior, various implementations of components that provide identical functional behavior but differ in their electrical, magnetic, or signal propagation properties, in addition to constraints that summarize the size and performance characteristics of the IC in order that a dynamic variant of the present invention may force the production of masks and process applications that satisfy the behavioral, size, and performance requirements. The variables and constraints used by such a device or automated process may also represent the costs of the various component implementations, the expected value and market demand of the IC for various size and performance ranges, costs of new IC fabrication start-up, in addition to constraints that summarize the costs and market value of an IC design in order that a conservative variant of this embodiment of the present invention may force the production of masks and process applications that optimize the cost of the IC relative to expected market value and demand.

Embodiment #17 (Control System Design)

One embodiment of the present invention is a device or automated process that produces a design of a control system, such as a nuclear reactor control system, or a control system for a forge, or any other system that controls a complex process.

The technical effect of this embodiment is the production of an optimal design, while saving computational costs associated with producing the optimization and while saving the wait-time of designers. This optimization typically uses variables and constraints that represent the available control elements, including their costs and effects, and a characterization of the control problem, including acceptable tolerances for the precision of control, in addition to constraints that summarize the cost or the precision in order that a conservative variant of this embodiment of the present invention may force a design that is optimized for cost or precision.

(See Blondel, Vincent D. and Megretski, Alexandre eds. *Unsolved Problems in Mathematical Systems and Control Theory* 2009.)

Embodiment #18 (Robotic Inverse Kinematics)

One embodiment of the present invention is a device or automated process that produces a set of instructions that guide the movement of a robot so that it achieves a specified position while traversing a field of obstacles.

The technical effect of this embodiment is the production of the set of robotic instructions, while saving computational costs associated with producing the set of instructions and while reducing the time to bring the instructions to production. Such a device or automated process typically uses variables and constraints that represent the desired destination position, the dimensions and positions of obstacles to be avoided, the dimensions and starting position of the robot, the possible motions of the robot, including the resultant change in position or dimensions of the robot and the cost of each motion, in addition to constraints that summarize the cost of the motion in order that a conservative variant of this embodiment of the present invention may force a set of instructions that result in motions that achieve the desired destination position with the least cost.

(See Parsons, David and Canny, John "Geometric Problems in Molecular Biology and Robotics" *ISMB* 1994.)

Embodiment #19 (Optimizing Compiler)

One embodiment of the present invention is a device or automated process that compiles software source code into machine code, whether the support is for register allocation, instruction selection, macro compression, loop optimization, data layout optimization, code parallelization, or any other complex compilation process.

The technical effect of this embodiment is the production of aggressively optimized machine code, while saving computational costs associated with the optimization and while saving the wait-time of code developers. This optimization typically uses variables and constraints that represent the source code, the available registers, including their sizes, the available operations, including their computational costs and any specific register assignments, the available spill resources, including their sizes and computational costs of access, and tilings that map source code instructions to sets of machine instructions, in addition to constraints that summarize the computational costs in order that a conservative variant of this embodiment of the present invention may force the production of machine code that satisfies the source code and has minimal computational costs.

(See Kremer, Ulrich "Optimal and Near-Optimal Solutions for Hard Compilation Problems" *Parallel Processing Letters* 1997;
Megiddo, Nimrod and Sarkar, Vivek "Optimal Weighted Loop Fusion for Parallel Programs" *Proceedings of the ninth annual ACM symposium on Parallel algorithms and architectures* 1997.)

Figure 2:
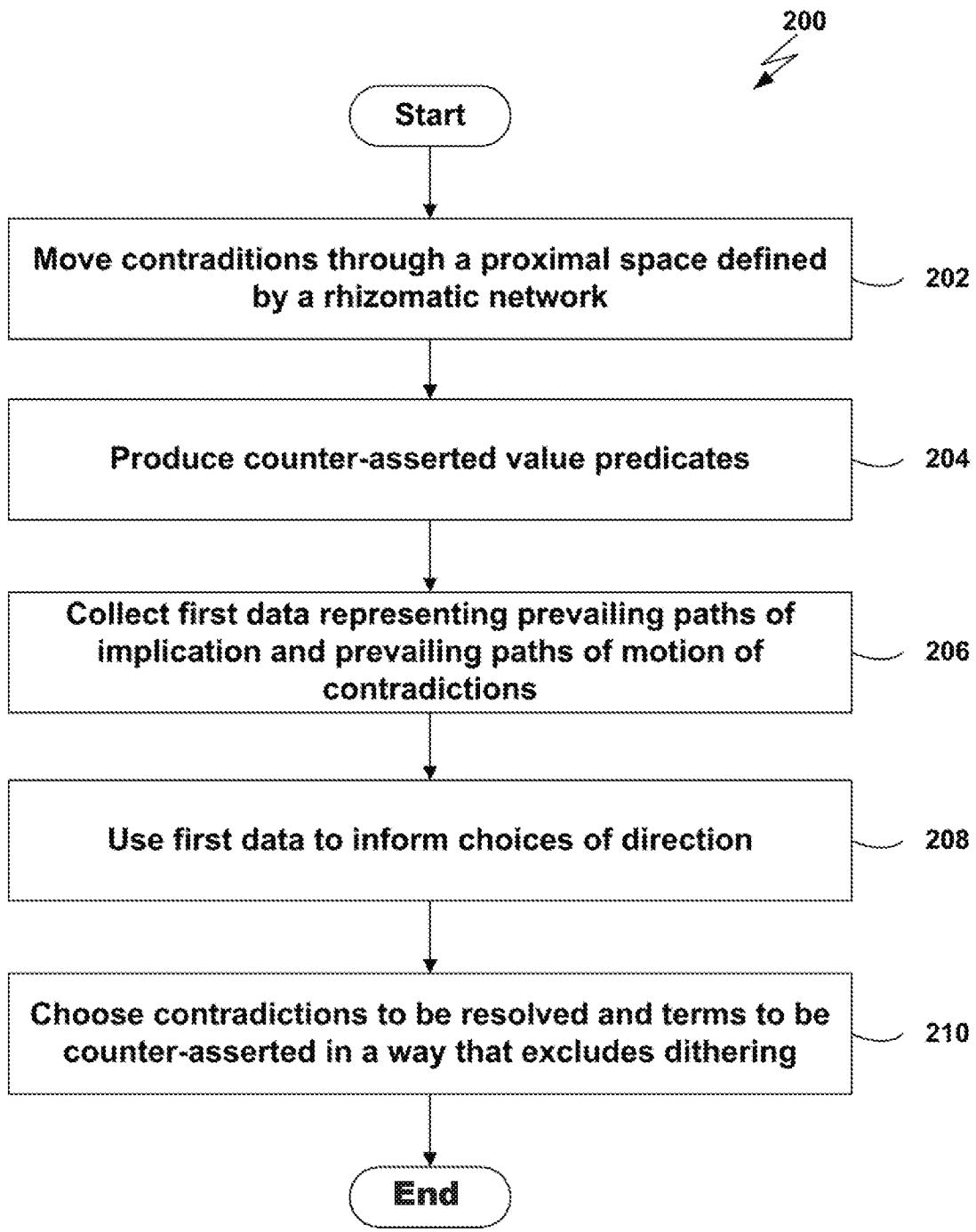
FIG. 2 shows a flowchart of a method performed by a computer system implemented according to one embodiment of the present invention.

Referring to FIG. 2, a flowchart is shown of a method 200 performed by a computer system implemented according to one embodiment of the present invention. The method 200 moves contradictions through a proximal space defined by a rhizomatic network that consists of prevailing paths of implication responsive to counter-asserting value predicates (FIG. 2, operation 202). The counter-assertions are assertions of value predicates that negate other assertions, which causes the prevailing paths of negated assertions to be moved from the prevailing paths of remaining assertions. The remaining assertions include the counter-assertions.

The method 200 also produces counter-asserted value predicates that do not create a contradiction in any constraint that remains in the prevailing path of the counter-assertion (FIG. 2, operation 204). The method 200 also collects first data representing the prevailing paths of implication and the prevailing paths of motion of contradictions (FIG. 2, operation 206). The method 1700 also uses the first data to inform choices of direction so that contradictions move toward locations in the proximal space where no validly reasoned disagreement is recorded (FIG. 2, operation 208). The method 200 also chooses contradictions to be resolved and terms to be counter-asserted in a way that excludes dithering (FIG. 2, operation 210).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Although certain embodiments may be described herein using language that may be similar to language that may be used to describe mental acts, such as "decide," "analyze," and "conclude," such language is used merely for convenience and as a shorthand to describe physical acts that are performed by embodiments of the present invention using physical components, such as transistors, logic gates, and processors. Such language, therefore, should be interpreted solely to refer to such physical acts performed by physical components, and not to any mental acts performed by the mind of a person or any other living being.

Similarly, although certain embodiments may be described herein using mathematical and philosophical language, such as "contradiction," "variable," and "constraint," such language is used merely for convenience and as a shorthand to describe concrete physical properties of physical components and physical acts that are performed by such components, and not to any abstract ideas, whether mathematical, philosophical, or otherwise. Such language, therefore, should be interpreted solely to refer to such physical properties of physical components and to physical acts performed by such components, and not to any abstract ideas, whether mathematical, philosophical, or otherwise.

The invention claimed is:

1. A method performed by at least one computer processor for solving a problem in NP, the method comprising:
    moving contradictions in constraints individually and incrementally through a proximal space of contiguous constraints defined by a rhizomatic network that consists of prevailing paths of implication responsive to counter-asserting value predicates, counter-assertions being assertions of value predicates that negate other assertions, which causes the prevailing paths of negated assertions to be removed from the prevailing paths of remaining assertions, the remaining assertions including the counter-assertions, thereby producing counter-asserted value predicates that do not create a contradiction in any constraint that remains in the prevailing path of the counter-assertion;

collecting first data representing the prevailing paths of implication and the prevailing paths of motion of contradictions;

using the first data to inform choices of direction so that contradictions move toward locations in the proximal space where no validly reasoned disagreement is recorded; and choosing contradictions to be resolved and terms to be counter-asserted in a way that excludes dithering.

2. The method of claim 1, wherein choosing comprises choosing in a way that excludes dithering that exceeds one traversal of a constraint in the problem representation per assumption.

3. The method of claim 1, wherein moving the contradictions through the proximal space comprises moving the contradictions through contiguous positions in the proximal space.

4. The method of claim 1,
wherein first data comprises a list of destinations in the prevailing path, and at least one of farness counts and nearness counts; and
wherein choosing the terms to be counter-asserted comprises choosing a term to be counter-asserted according to a Nearest Destination method.

5. The method of claim 1,
wherein first data comprises a list of destinations in the prevailing path, a list of conditional prevailing assertions in the prevailing path, and farness counts; and
wherein choosing the terms to be counter-asserted comprises choosing a term to be counter-asserted according to a Farthest Reversal method.

6. The method of claim 1,
wherein choosing the contradictions to be resolved comprises choosing a contradiction that occupies a constraint that provided a prevailing assertion that restricted a term in the constraint of the contradiction that was most recently resolved.

7. A computing device comprising:
a non-transitory memory; and
a processor;
wherein the non-transitory memory comprises signals representing a plurality of computer-readable instructions; and
wherein the processor is adapted to execute the plurality of computer-readable instructions to perform a method for solving a problem in NP, the method comprising:
moving contradictions in constraints individually and incrementally through a proximal space of contiguous constraints defined by a rhizomatic network that consists of prevailing paths of implication responsive to counter-asserting value predicates, counter-assertions being assertions of value predicates that negate other assertions, which causes the prevailing paths of negated assertions to be removed from the prevailing paths of remaining assertions, the remaining assertions including the counter-assertions, thereby producing counter-asserted value predicates that do not create a contradiction in any constraint that remains in the prevailing path of the counter-assertion;

collecting first data representing the prevailing paths of implication and the prevailing paths of motion of contradictions;

using the first data to inform choices of direction so that contradictions move toward locations in the proximal space where no validly reasoned disagreement is recorded; and choosing contradictions to be resolved and terms to be counter-asserted in a way that excludes dithering.

8. The computing device of claim 7, wherein choosing comprises choosing in a way that excludes dithering that exceeds one traversal of a constraint in the problem representation per assumption.

9. The computing device of claim 7, wherein moving the contradictions through the proximal space comprises moving the contradictions through contiguous positions in the proximal space.

10. The computing device of claim 7,
wherein first data comprises a list of destinations in the prevailing path, and at least one of farness counts and nearness counts; and
wherein choosing the terms to be counter-asserted comprises choosing a term to be counter-asserted according to a Nearest Destination method.

11. The computing device of claim 7,
wherein first data comprises a list of destinations in the prevailing path, a list of conditional prevailing assertions in the prevailing path, and farness counts; and
wherein choosing the terms to be counter-asserted comprises choosing a term to be counter-asserted according to a Farthest Reversal method.

12. The computing device of claim 7,
wherein choosing the contradictions to be resolved comprises choosing a contradiction that occupies a constraint that provided a prevailing assertion that restricted a term in the constraint of the contradiction that was most recently resolved.

13. The computing device of claim 7, wherein the component adapted to perform branch-subtraction of the assertion from the second full reason is further adapted to perform branch-subtraction of the assertion from a first full reason.

* * * * *

UNITED STATES PATENT AND TRADEMARK OFFICE
CERTIFICATE OF CORRECTION

PATENT NO. : 10,528,868 B2
APPLICATION NO. : 15/126227
DATED : January 7, 2020
INVENTOR(S) : Clayton Gillespie Page 1 of 2

It is certified that error appears in the above-identified patent and that said Letters Patent is hereby corrected as shown below:

In the Specification

Column 3, Lines 16-17, delete:
"following table:

| | B | CDEF | GHJK | MNPQ | RSTU | Z |
|---|---|---|---|---|---|---|
| 1 | O | | | | | O |
| 2 | O | | | | | O |
| 3 | | O | | X | X | |
| 4 | | O | | X | X | |
| 5 | | O | | X | X | |
| 6 | | O | | X | X | |
| 7 | | | O | X | X | |
| 8 | | | O | X | X | |
| 9 | | | O | X | X | |
| 10 | | | O | X | X | |
| 11 | X X X X | | | | | |
| 12 | | | | O | O | |
| 13 | | | | O | O | |
| 14 | | | O | | X X | |
| 15 | | | O | | X X | |
| 16 | | | O | | X X | |
| 17 | | | O | | X X | |
| 18 | | | O | | X X | |
| 19 | | | O | | X X | |
| 20 | | | O | | X X | |
| 21 | | | O | | X X | |
| 22 | | X X X X | | | | |
| 23 | | | | O | | O |
| 24 | | | | O | | X |

"

Signed and Sealed this
Second Day of June, 2020

Andrei Iancu
*Director of the United States Patent and Trademark Office*

And insert:
-- following table:

|    | B | C | D | E | F | G | H | J | K | M | N | P | Q | R | S | T | U | Z |
|----|---|---|---|---|---|---|---|---|---|---|---|---|---|---|---|---|---|---|
| 1  | O |   |   |   |   |   |   |   |   |   |   |   |   |   |   | O |   |   |
| 2  | O |   |   |   |   |   |   |   |   |   |   |   |   |   |   |   | O |   |
| 3  |   | O |   |   |   |   |   |   | X |   | X |   |   |   |   |   |   |   |
| 4  |   | O |   |   |   |   |   |   |   | X |   | X |   |   |   |   |   |   |
| 5  |   |   | O |   |   |   |   |   |   | X |   | X |   |   |   |   |   |   |
| 6  |   |   | O |   |   |   |   |   |   | X |   | X |   |   |   |   |   |   |
| 7  |   |   |   | O |   |   |   |   | X |   | X |   |   |   |   |   |   |   |
| 8  |   |   |   | O |   |   |   |   |   | X |   | X |   |   |   |   |   |   |
| 9  |   |   |   |   | O |   |   |   | X |   | X |   |   |   |   |   |   |   |
| 10 |   |   |   |   | O |   |   |   |   | X |   | X |   |   |   |   |   |   |
| 11 | X | X | X | X |   |   |   |   |   |   |   |   |   |   |   |   |   |   |
| 12 |   |   |   |   |   |   |   |   |   |   |   | O |   | O |   |   |   |   |
| 13 |   |   |   |   |   |   |   |   |   |   |   |   | O |   | O |   |   |   |
| 14 |   |   |   |   | O |   |   |   |   |   |   |   |   | X |   | X |   |   |
| 15 |   |   |   |   |   | O |   |   |   |   |   |   |   | X |   | X |   |   |
| 16 |   |   |   |   |   |   | O |   |   |   |   |   |   | X |   | X |   |   |
| 17 |   |   |   |   |   |   | O |   |   |   |   |   |   |   | X |   | X |   |
| 18 |   |   |   |   |   |   |   | O |   |   |   |   |   | X |   | X |   |   |
| 19 |   |   |   |   |   |   |   | O |   |   |   |   |   | X |   | X |   |   |
| 20 |   |   |   |   |   |   |   |   | O |   |   |   |   | X |   | X |   |   |
| 21 |   |   |   |   |   |   |   |   | O |   |   |   |   | X |   | X |   |   |
| 22 |   |   |   |   | X | X | X | X |   |   |   |   |   |   |   |   |   |   |
| 23 |   |   |   |   |   |   |   |   |   | O |   |   |   |   |   |   |   | O |
| 24 |   |   |   |   |   |   |   |   |   |   | O |   |   |   |   |   |   | X |

--, therefor.